June 30, 1931.  S. BRAND  1,812,194
CASH REGISTER
Filed Jan. 26, 1929  8 Sheets-Sheet 2
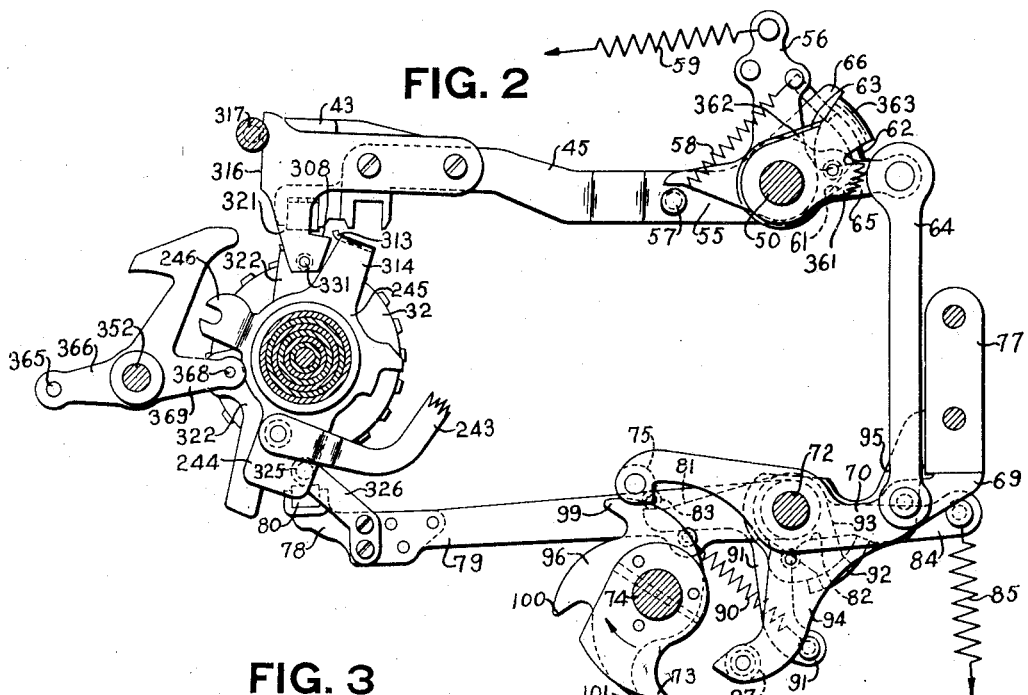
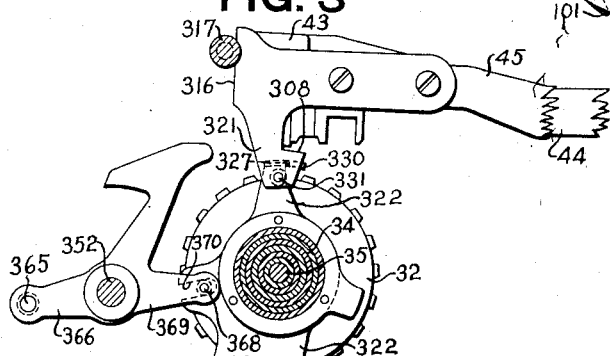
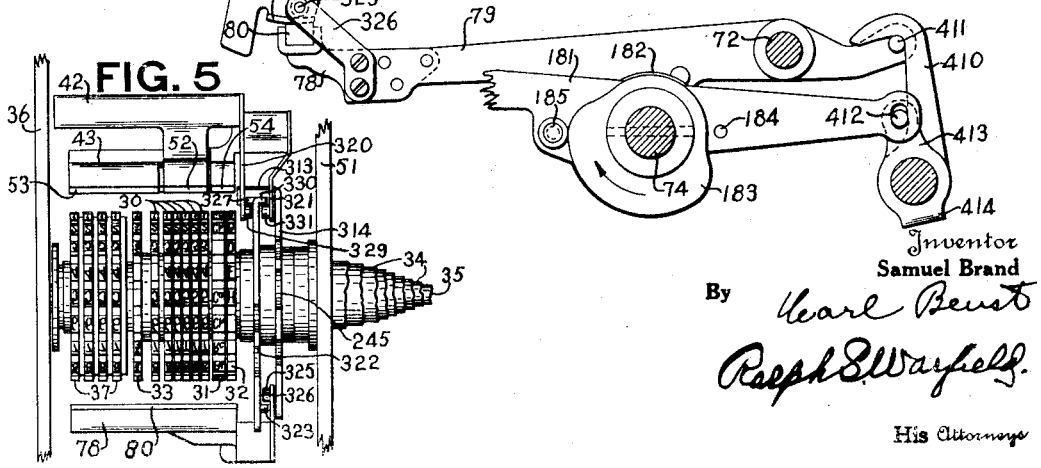
Inventor
Samuel Brand
By Carl Beust
Ralph E. Warfield
His Attorneys

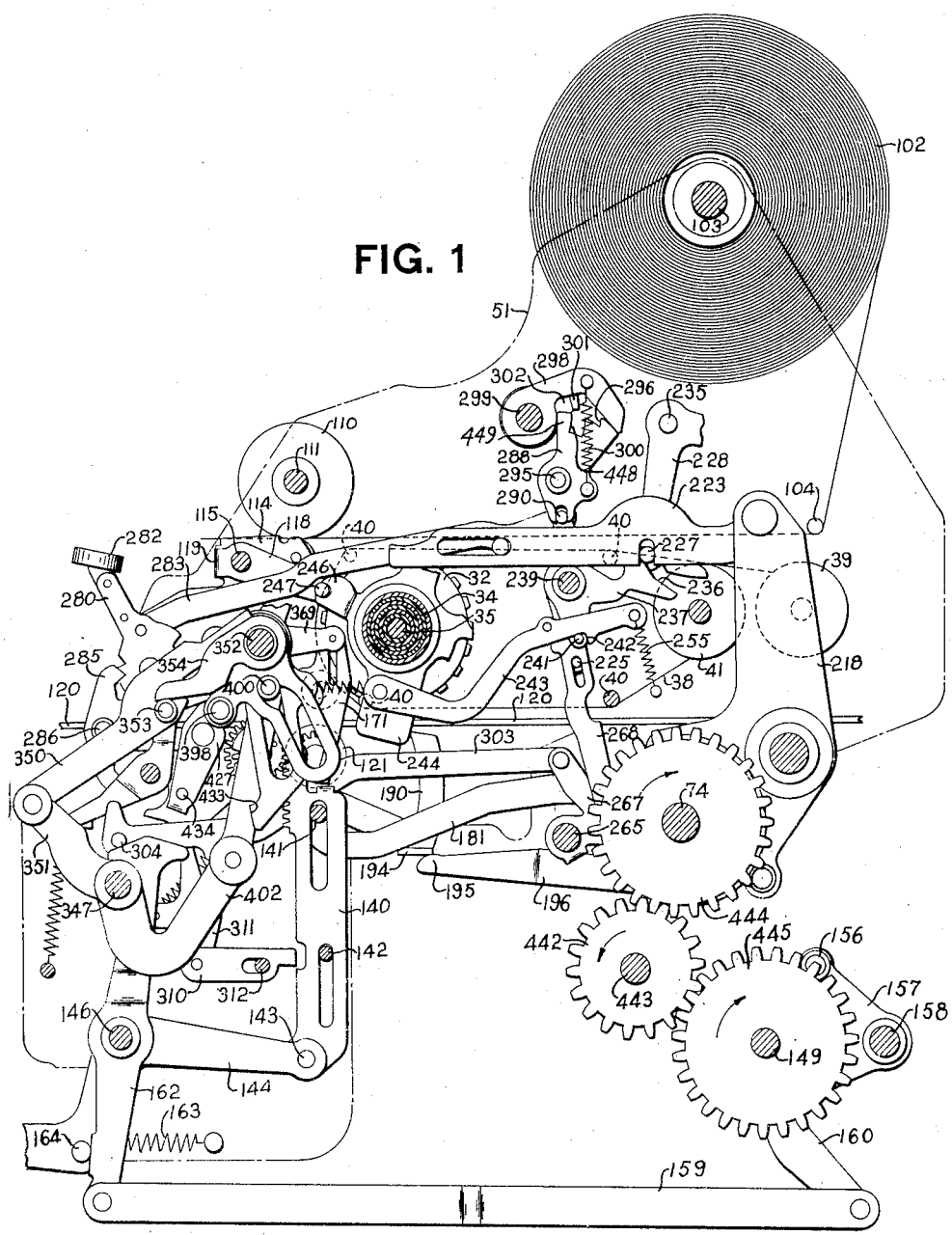

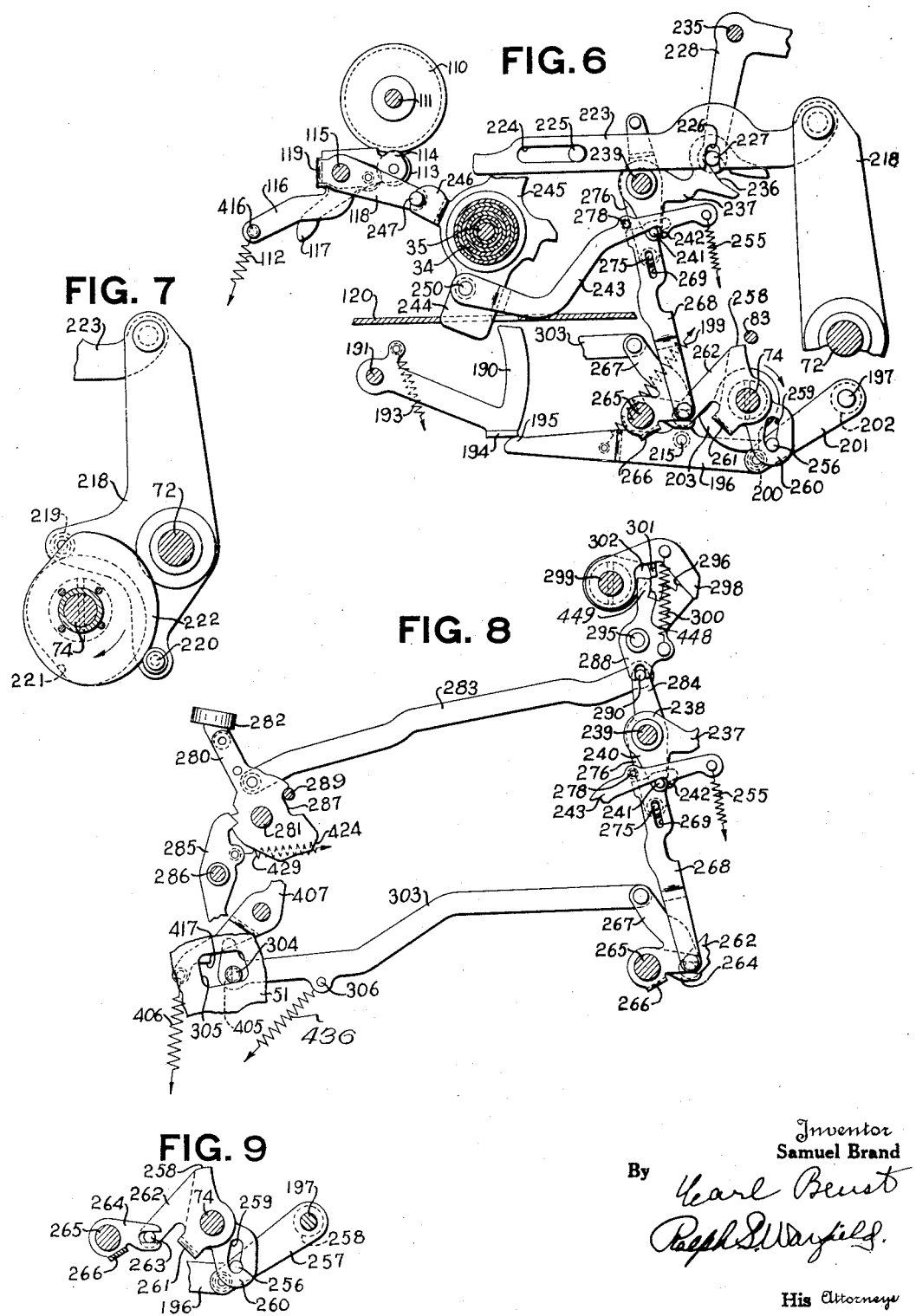

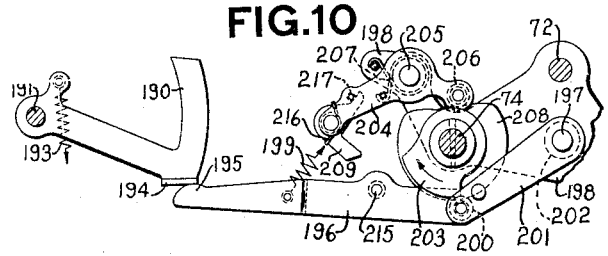

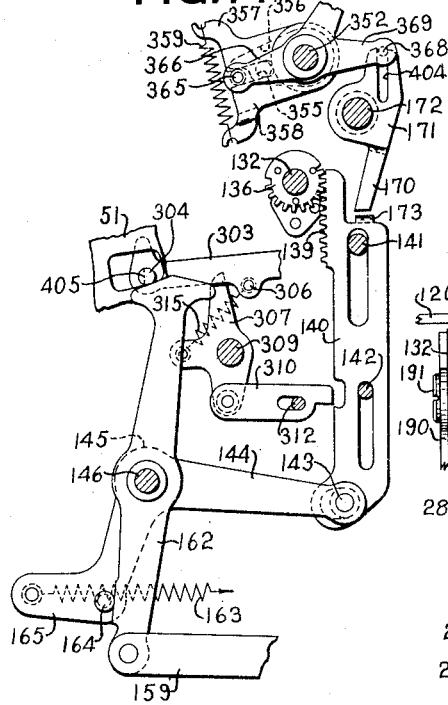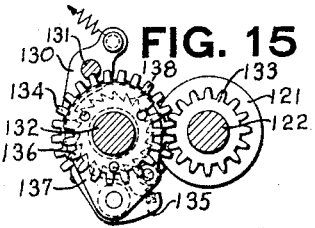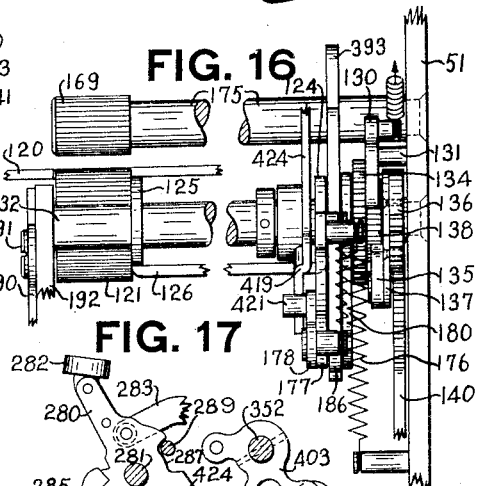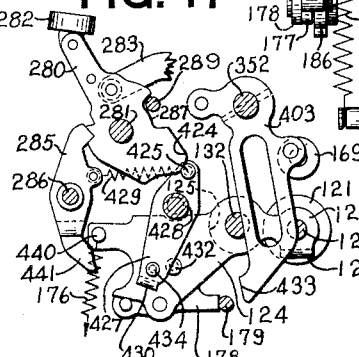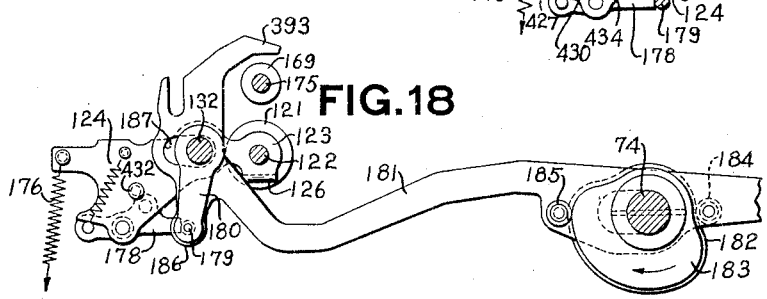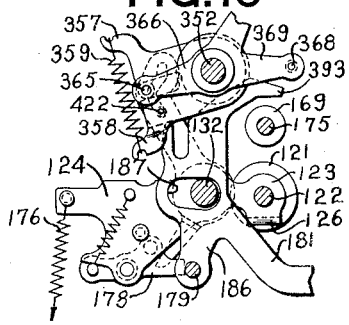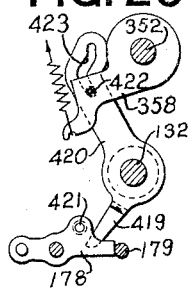

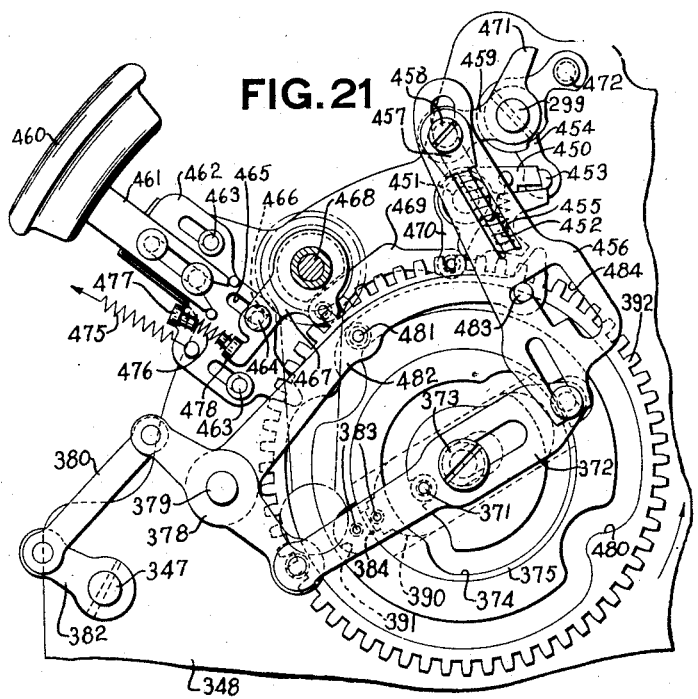
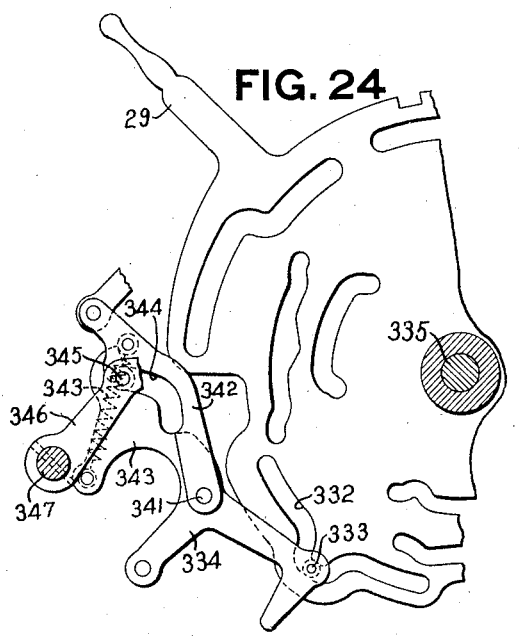

June 30, 1931.  S. BRAND  1,812,194
CASH REGISTER
Filed Jan. 26, 1929   8 Sheets-Sheet 7
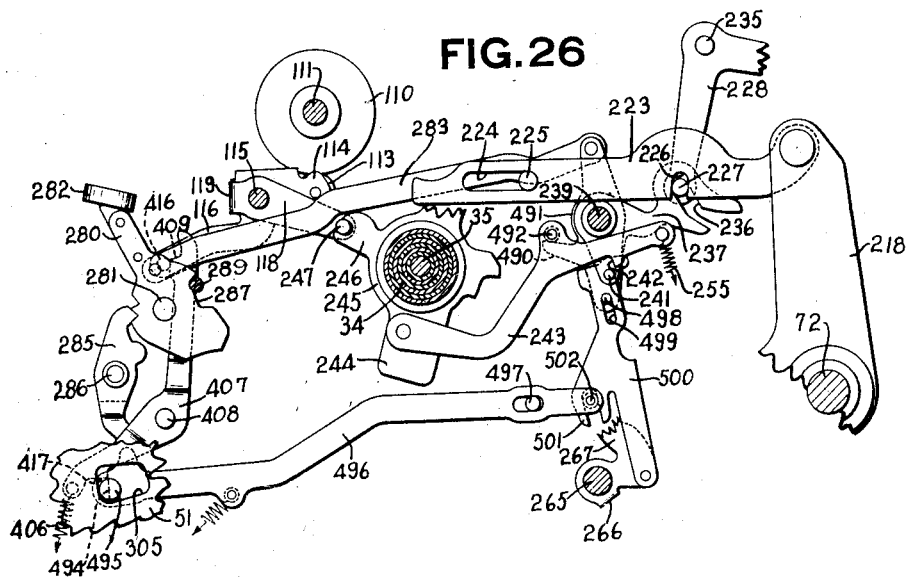
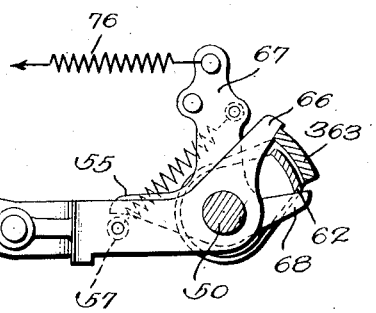
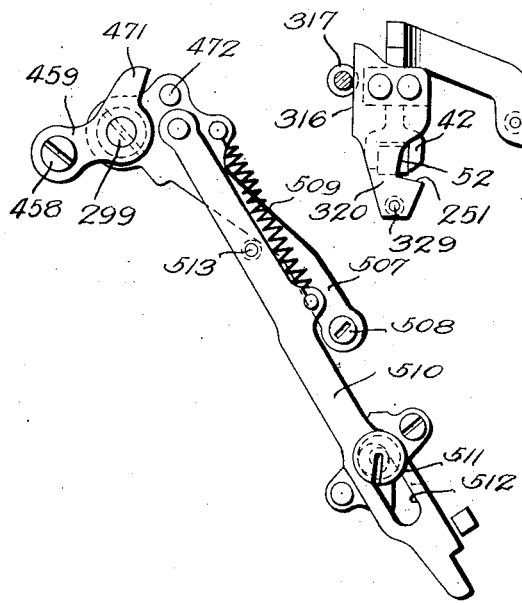
Inventor
Samuel Brand
By Carl Beust
Ralph S. Warfield
His Attorneys June 30, 1931.  S. BRAND  1,812,194
CASH REGISTER
Filed Jan. 26, 1929   8 Sheets-Sheet 8
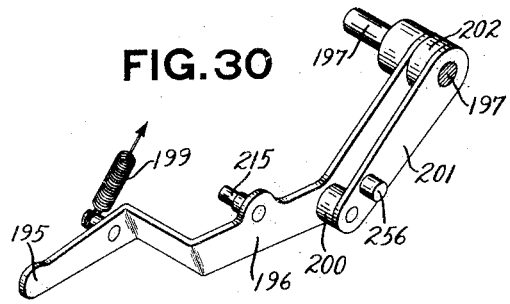
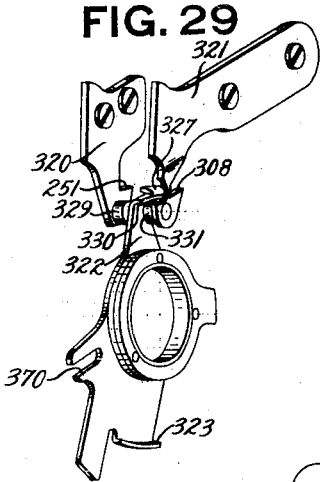
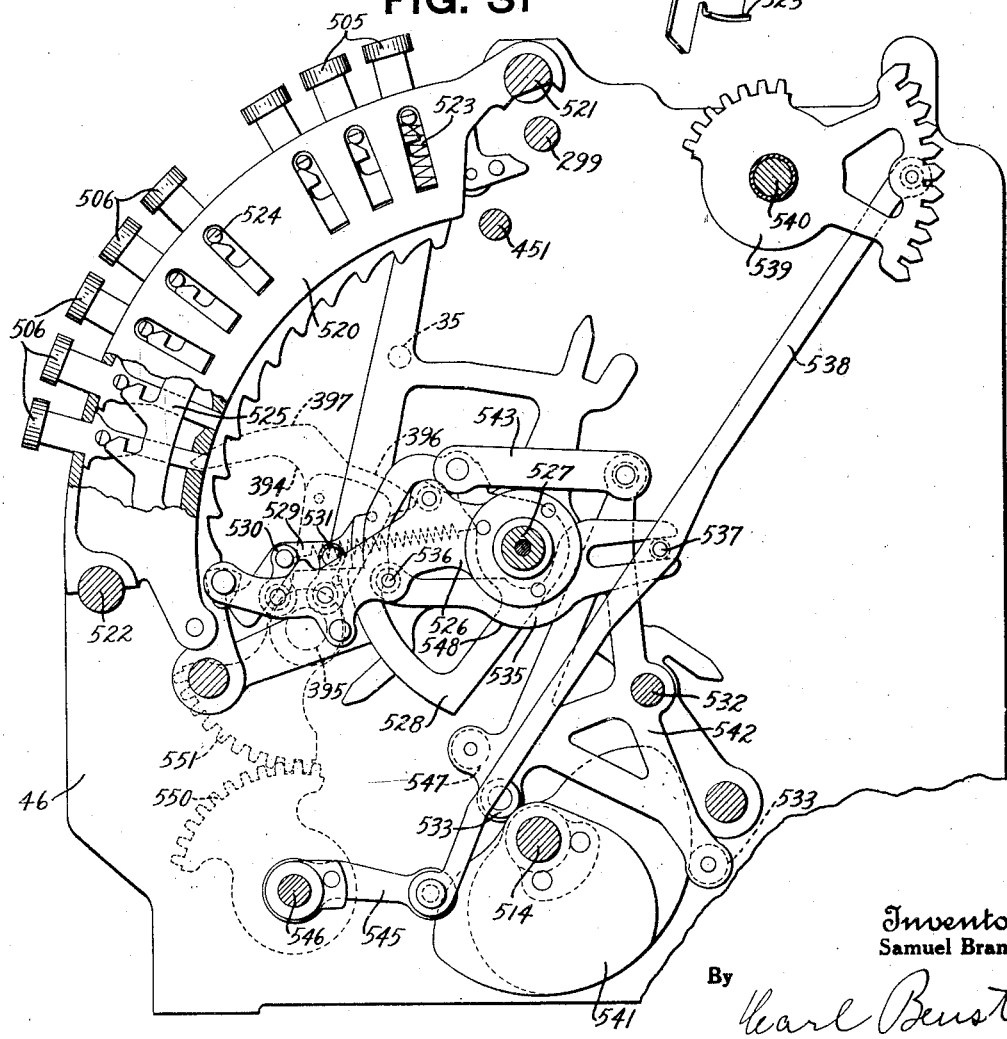
Inventor
Samuel Brand
By
His Attorney Patented June 30, 1931

1,812,194

UNITED STATES PATENT OFFICE

SAMUEL BRAND, OF DAYTON, OHIO, ASSIGNOR TO THE NATIONAL CASH REGISTER COMPANY, OF DAYTON, OHIO, A CORPORATION OF MARYLAND

CASH REGISTER

Application filed January 26, 1929. Serial No. 335,337.

This invention relates to cash registers and more particularly to improvements in printing mechanisms therefor.

The invention is illustrated as applied to a machine of the type disclosed in applications for Letters Patents of the United States, Serial Numbers 608,281, and 687,305, filed December 21, 1922 and January 19, 1924, respectively, by B. M. Shipley.

The cash register disclosed in the above applications is equipped with a plurality of totalizers, and is capable of registering several kinds of transactions. For instance, multiple item transactions, which include the registration of more than one item and taking the total thereof; single item transactions, wherein but a single item is registered; and totalizing operations, whereby the total accumulated on any totalizer may be taken therefrom. The machines of the type disclosed in the above-mentioned applications are provided with printing mechanisms adapted to print both single-item and multiple-items transactions on either an issuing check or on an inserted slip, but not on both in the same machine.

It is, therefore, an object of the present invention to provide a machine of the type disclosed in the above applications, with novel printing mechanism, whereby the items and totals of the transactions registered in the machine may be printed either on inserted record material or on issuing record material by the same machine at the will of the operator.

Another object is to provide a machine of the type disclosed in the above applications, with novel means operated under the control of inserted record material to render the issuing receipt tension device ineffective.

Another object is to provide a machine capable of printing single-item receipts or multiple-item receipts on insertible record material, with novel means, controllable by the insertible record material, to prevent the issuance of a receipt.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a sectional view taken to the left of the left side frame of the machine in connection with which the device is adapted to be used, and shows the various controlling devices associated with the printer.

Fig. 2 is a detail view of the printing hammers with the operating and controlling mechanism therefor.

Fig. 3 is a detail view of part of the hammer control means.

Fig. 4 is a fragmentary view of the device for lowering the check or receipt printing hammer to enable the hammer control to become effective.

Fig. 5 is a fragmentary view, in front elevation, of the group of type wheels and the printing hammers.

Fig. 6 is a detail view of the slip feeler, the check tension device, the check tension operating mechanism, and the means whereby the slip feeler controls the check tension device.

Fig. 7 is a view of the means for driving the check tension release mechanism.

Fig. 8 is a detail view of the slip key and the mechanism whereby depression of said key controls the check tension device.

Fig. 9 is a view of a part of the slip feeler mechanism.

Fig. 10 is a detail view of the slip feeler and the restoring mechanism therefor.

Fig. 11 is a detail view of the mechanism for controlling the check tension device.

Fig. 12 is a detail view of the mechanism actuated by the total control lever, and also actuated under the control of the single-item and multiple-item keys (not shown) to control the printing mechanism.

Fig. 13 shows the same mechanism as Fig. 12, with the parts in the position they assume when the total control lever is moved to one of its total or sub-total taking positions.

Fig. 14 is a view of a part of the slip feeding mechanism and the controlling means therefor.

Fig. 15 is a detail view of the slip feeding roller and a part of the driving mechanism therefor.

Fig. 16 is a fragmentary view, in front elevation, showing the slip feeding rollers and the operating means therefor.

Fig. 17 is a detail view of the slip key and its control of the slip tension device.

Fig. 18 is a detail view of the slip tension operating mechanism.

Fig. 19 is a detail view of the slip tension controlling means.

Fig. 20 is a view of a part of the mechanism shown in Fig. 19.

Fig. 21 is a partial view, in right elevation, of the machine release key, and mechanism operated thereby to release the machine for operation.

Fig. 22 is an illustrative form of receipt issued by the machine on multiple-item transactions.

Fig. 23 illustrates one form of single-item receipt issued by the machine.

Fig. 24 is a fragmentary view of the total control lever with certain mechanism actuated thereby.

Fig. 25 shows one form of a duplicate sales slip printed by the machine.

Fig. 26 illustrates a modified form of the check tension controlling mechanism.

Fig. 27 is a detail view of the item printing hammer, and a part of its operating mechanism.

Fig. 28 is a detail view of the means for manually rocking the release shaft to release depressed keys.

Fig. 29 is a perspective view of the impression hammer throwout controlling device.

Fig. 30 is a perspective view of the slip feeler controlling arm.

Fig. 31 is a detail view showing the transaction bank of a machine of the type to which the present invention is applied.

General description

A brief description of the machine, in connection with which the present invention is adapted to be used, will be given before the mechanism comprising the invention itself is described. It is thought that such a description will be of assistance in understanding the purpose and operation of the present invention.

Such a machine as is disclosed in the Shipley applications, noted above, in general, includes a plurality of totalizers, one for each classification of transactions, and an item totalizer for accumulating the items of a transaction. A plurality of manipulative keys is provided to control differential mechanism to select the totalizers and add amounts thereon.

The differential mechanism also adjusts the printing mechanism to print the amounts entered into the totalizers, and the total thereof on an issuing receipt and also on a record strip retained in the machine.

The differential mechanism also provides a convenient means to set indicators to display the amounts entered in the item totalizer and the total thereof, or the totals accumulated in the other totalizers with which the machine is provided.

The printing mechanisms disclosed in the above Shipley applications include type lines consisting of amount type wheels, clerks' initial type wheels, transaction type wheels and consecutive number type wheels. A second type line in each of said printing mechanisms includes date type wheels. The amount and transaction type wheels are set differentially under the control of their respective keys. The date type wheels are set manually, and the consecutive number type wheels may be advanced step by step at each operation of the machine by any suitable means.

Various devices were included in the previous machines to control the check feed to issue a long or short check or receipt, but no mechanism was provided to disable the check feeding mechanism. The detail record printing hammer was controlled to print the amounts of single-item transactions, and totals of multiple-transactions only.

Some of these controls are used in combination with the present invention and other controls have been added to accomplish new functions.

Such a machine in its preferred embodiment is well adapted for use in retail stores, etc., wherein it is advantageous to issue itemized printed receipts to the customers, and to retain in the machine a record strip upon which is printed the totals of all multiple-item transactions, and the amounts of all single-item transactions.

The machine disclosed in Shipley's application, Serial Number 687,305, may be made to print on an inserted slip, in which case, however, the slip is merely substituted for the issuing check or receipt and receives impressions of all the items as well as the total thereof of each multiple-item transaction. The present invention provides a machine of the above type with mechanism to control the printer to issue either an itemized receipt containing the printed items and the total thereof, a single-item receipt having the amount of the transaction printed thereon, or to print the totals of the multiple item transactions in duplicate on an inserted slip. The invention also provides means to control the printer to print the amounts of the single-item transactions on an inserted slip.

The description of the machine on which the improved printing device is adapted to be used, is omitted from this specification, and only those parts thereof which exercise a control over the printing device are illustrated herein. For a full and complete understanding of the machine, reference should be made to either or both of the above-mentioned Shipley applications, Serial Numbers 608,281 and 687,305.

The printing device is attached to the left side frame of the machine and the drawings all show the mechanism as looking from the machine towards the printing device, because the construction and operation thereof, in this manner, may be better illustrated.

Type wheels

The type wheels of the present machine are differentially set under the control of the amount keys, transaction keys (Fig. 31), and clerks' keys, the amount and clerk's keys are not shown herein, and by a total control lever 29 (Fig. 24). Amount type wheels 30 (Fig. 5), a transaction type wheel 31, a clerk's type wheel 32, and the type wheel 33 set by the total control lever 29, are secured to the outer ends of nested tubes 34 surrounding a shaft 35 supported in a printer side plate 36 and in the left side frame 46 (Fig. 31) of the macine. Consecutive number type wheels 37 are mounted on the shaft 35 and any suitable means may be provided to position them. Two sets of characters are engraved on each of the above-named type wheels, so that impressions are made on the issuing receipt at the tops of the wheels from one set of characters, and impressions are taken from the other set of characters at the bottoms of the wheels on the detail record strip and on the inserted slip.

Ink ribbon

To make the impressions from the type wheels legible, an ink ribbon 38 (Fig. 1) is interposed between said type wheels and the record materials. The ribbon 38 is unwound from a spool 39, and passes around four studs 40 and a type wheel guard (not shown), and is wound on a spool 41. The spools 39 and 41 may be operated by any suitable means, which may also include a suitable reversing mechanism. The ribbon 38 passes between the type wheels and the upper and lower impression means in order to enable said impression means to make legible, impressions on the record materials from the type wheels. Ink ribbons of this type are old and well known in the art and the one here shown, has no particular bearing on the present invention and no further mention thereof will be made in the present application.

Printing hammers

In the previous machines of this type, two hammers were employed at the upper printing line to print the receipts or checks. When printing the items of the multiple-item transactions, it is desired to print the amount of the item only, and hence one hammer was coextensive with the amount type wheels of lower denomination only, but when the total of the items is printed, it is desired to print certain other data, such as, for instance, the consecutive number of the transaction, characters to indicate that the operation was a total-taking operation, and to designate the kind of transaction, and a clerk's initial.

For this purpose, a second hammer, known as the total hammer, is employed and lies in alinement with the amount-printing hammer and is coextensive with the remaining type wheels at the printing line other than the amount type wheels of lower denominations. When printing the receipt to be issued on a single-item transaction, both hammers are used simultaneously as it is desired to print data in addition to the amount of the sale. A third hammer is provided to print from a fixed electro, but as this hammer has no particular bearing on the present invention, no further mention thereof will be made.

A single hammer operates on the type wheels from beneath, to make the impression on the detail record strip and on the inserted slip. None of the items of a multiple-item transaction are printed on the detail strip or on the inserted slip, and this hammer is disabled under the control of the multiple item keys 505 (Fig. 31), but is rendered effective by mechanism under control of the total control lever 29, to print the total only, of multiple-item transactions, as will be described more fully hereinafter.

The lower or slip printing hammer is also controlled by depression of a single-item key 506 to print a record of each single-item transaction on a detail strip and on an inserted slip.

In previous machines of this type, the above-mentioned hammers are controlled by the various manipulative devices to print on a multiple-item issuing receipt, a single-item receipt, and on the record strip, as is fully set forth in the Shipley applications above mentioned. Similar hammers are employed in the machine of the present invention and are similarly controlled to print on a multiple-item receipt or on a single-item receipt and on a record strip. In addition, the lower hammer is controlled to print twice on a duplicate sales slip, once on the original and once on the duplicate. However, when such a sales slip has been inserted in the machine, a slip feeler mechanism controls mechanism to disable the item and total hammers and the check tension device to prevent the issuance of a check or receipt.

The check feed mechanism provided in the present machine is the same as that of the previous machine, and is controlled in the same manner to impart a short or long feed to the check or receipt paper. In the present machine, however, the check tension device is controlled by the insertible slip or by a "slip" key, so that when a slip is in position in the machine, or when the "slip" key is pressed, the check tension is disabled, thereby rendering the check feed, which operates at each operation of the machine, ineffective and the check strip will not be fed.

The slip feed is controlled to feed the slip on total-taking operations and on single-item entering operations, but is adapted to be disabled when registering the items of a multiple-item transaction. Mechanism is also provided under control of the slip feeler to disable the slip feed mechanism when no slip has been placed in position in the machine to receive an impression.

An item printing hammer 42 (Fig. 27), and a total printing hammer 43, (Figs. 2, 3 and 5), are carried on arms 44 and 45 respectively, journaled on a stud 50 projecting laterally from the printer frame 51 (Fig. 1) suitably supported on the left side frame 46 (Fig. 31) of the machine. The item printing hammer 42 carries a platen 52 (Fig. 5) adapted to cooperate with the lower order amount type wheels to print the items during the entry of multiple-item transactions, and in combination with the total printing hammer 43 associated with the higher order type wheels, to print the totals of multiple-item transactions. The item printing hammer 42 is also operated when entering a single-item transaction to print the amount of the transaction, in combination with the total printing hammer 43, and to print the totals taken from the other totalizers in the machine. The total printing hammer 43 carries two platens 53 and 54 spaced apart from one another, one of which, 54, occupies a position to the right of and in line with the item printing platen 52, as viewed in Fig. 5, and is adapted to cooperate with the transaction type wheels 31 and the clerk's type wheels 32. The other total printing platen 53 carried by the total printing hammer 43, occupies a position to the left of the item printing platen 52, as viewed in Fig. 5, and is in line therewith. This platen 53 cooperates with the higher order amount wheels, the total designation wheel 33, and the consecutive number type wheels 37 to print data from these wheels, on total taking operations and on single-item transaction operations. Both the item printing hammer 42 and the total printing hammer 43 are operated from a common source, but are controlled independently of each other, as will be seen from the following description.

The mechanisms for operating the item printing hammer 42 and the total printing hammer 43 being just alike, it is thought that a description of one set of this mechanism will suffice. Since the parts for operating the total printing hammer 43 appear in Fig. 2, this structure will be described.

The forwardly extending arm 55 (Fig. 2) of a hammer-operating lever 56 pivoted on the stud 50, which supports the hammer arms 44 and 45, cooperates with a stud 57 projecting laterally from the total printing hammer arm 45. A yoke 363 (Figs. 2 and 27) contacting the tail 66 of the hammer 45 (Fig. 2), normally maintains the hammer in position with the stud 57 slightly spaced from the arm 55. The purpose of normally maintaining this spaced relation between the stud 57 and arm 55 is later described. But near the beginning of the operation of the machine the yoke 363 is rocked clockwise away from the tail 66 and a hammer retracting spring 58 draws the stud 57 and its arm 45 together with the platen upwardly so that the stud 57 contacts the lower edge of the arm 55. A strong hammer operating spring 59, one end of which is secured to the hammer operating lever 56, and the other end anchored to a stud (not shown) projecting laterally from the printer frame 51, holds a rearwardly extending arm 61 of the hammer operating lever 56 in contact with the lower edge of a universal hammer driving bail 62, the supporting arms 63 of which are journaled on the stud 50. An operating lever 67 (Fig. 27), similar to the total hammer operating lever 56, is provided for the item printing hammer and operates at the same time and in the same manner as the lever 56 for the total printing hammer. The hammer driving bail 62 also lies over a rearwardly extending arm 68 of the operating lever for the item printing hammer, which arm corresponds to the arm 61 of the operating lever 56.

To operate the universal bail 62 to retract and to discharge the hammers 42 and 43, a link 64 connects an arm 65, journaled on the stud 50 and secured to the inner arm 63 of the bail 62, with a lever 70 pivoted on a stud 72 projecting laterally from the printer frame 51. A hammer operating cam 73 fast on a printer drive shaft 74 journaled in the left side frame 46 (Fig. 31) of the machine and in the printer frame 51, cooperates with a roller 75 on the forward end of the lever 70, to rock the lever first clockwise, as viewed in Fig. 2, to place additional tension on the hammer operating springs 59, and to cock the item and total hammers, and then to release the lever 70 to permit springs 59 to rock the hammers 42 and 43 sharply counter-clockwise to make the impressions on the check or receipt web.

As the drive springs 59 (Fig. 2), and 76 (Fig. 27), rock their respective levers 56 and 67 sharply counter-clockwise to make the impressions, the bail 62, link 64 and lever 70, are carried therewith until a projection 69 of the lever 70 strikes an abutment 77 secured to the printer frame 51, whereupon the lever 70, link 64, bail 62 and the hammer operating levers 56 and 67 are arrested. The momentum of the hammers 42 and 43, however, carries the platen 52 on the item hammer 42 and the platens 53 and 54 on the total hammer 43 sharply into contact with the previously positioned type wheels to take impressions therefrom.

In order to make the impressions from the lower sets of types, on the detail record strip and on the duplicate sales slip inserted in the machine, a slip printing hammer 78 (Figs. 2, 3 and 5), is provided, which is carried by an arm 79 journaled on the stud 72, and upon operation of the machine, the platen 80 mounted in and forming part of the hammer 78, is driven sharply into contact with the lower portion of the type wheels to take an impression therefrom. The forward end of an arm 81 (Fig. 2) of a hammer operating lever 82 journaled on the stud 72, cooperates with a stud 83 on the slip printing hammer arm 79. To the end of another arm 84 of the hammer operating lever 82 is attached one end of a strong drive spring 85, the other end of which spring is fast to a stud (not shown) on the printer frame 51. A hammer retracting spring 90, attached to a downwardly projecting arm 91 of the lever 82 and to a stud on the hammer arm 79, tends to maintain the stud 83 in contact with the arm 81 of the lever 82.

The clockwise pull of the drive spring 85 urges the hammer-operating lever 82 clockwise against a bail 92 having supporting arms 93 journaled on the stud 72. One of the arms 93 of the bail 92 is fastened to an actuating lever 94 also journaled on the stud 72, one arm 95 of which lever terminates in a foot adapted to strike the vertical side of the abutment 77 to limit the clockwise movement of the actuating lever 94 and consequently of the operating lever 82. A cam 96 fast on the shaft 74 cooperates with a roller 97 on the actuating lever 94 to rock this lever, and the bail 92, and hammer operating lever 82 counter-clockwise.

When this occurs, the retracting spring 90 draws the hammer arm 79 downwardly, keeping the stud 83 in contact with the arm 81. The shaft 74, as stated above, makes one clockwise rotation, as viewed in Fig. 2, at each operation of the machine. and as the cam 96 is provided with three adjacent lobes 99, 100 and 101, said lobes rock the actuating lever 94, the bail 92 and the hammer operating lever 82 counter-clockwise three times at each operation of the machine, to rock the slip and detail printing hammer operating mechanism counter-clockwise, thereby lowering the platen 80, against the tension of its drive spring 85. As the tip of the each lobe passes by the roller 97, the drive spring 85 rocks the lever 82, bail 92 and the hammer arm 79 sharply clockwise until the foot 95 strikes the abutment 77, whereupon the lever 94 and bail 92 are arrested. The momentum of the hammer 78, however, is sufficient to carry it upwardly against the type wheels to take impressions therefrom on the duplicate sales slip and on the detail record strip, the lobes 99 and 100 effecting the impressions on the slip (Fig. 25) and the lobe 101 operating the hammer to print on the detail strip.

On operations when no slip has been placed in position in the machine, the slip printing hammer is prevented from making the first two impressions. The slip printing hammer is disabled also on the item entering operations of a multiple-item transaction, but is rendered operable when taking the total of a multiple-item transaction, and when single-item transactions are entered in the machine. The means for so controlling the lower hammer will be described later.

*Check or receipt feeding mechanism*

The check or receipt web is unwound from a supply roll 102 (Fig. 1) supported on a stud 103, projecting laterally from the printer frame 51. The web passes around a guide stud 104 also projecting from the printer frame, after which the web passes between the item and total printing hammers 42 and 43 and the type wheels, and then beneath a check feed roller 110 mounted on a stud 111 on the printer frame 51. Mechanism not shown herein, is operated under the control of the multiple-item and single-item keys 505 and 506 (Fig. 31), and the total control lever 29 (Fig. 24) to rotate the feed roll 110 and advance the check web a comparatively long distance on total taking and on single-item operations, and a comparatively short distance on operations wherein the items of a multiple-item transaction are entered in the machine. This feeding mechanism is fully disclosed in the before-mentioned Shipley applications and it is unnecessary to include a detailed description of the same in this application.

*Check tension mechanism*

In order that the check feed roller 110 may feed the check web, a spring 112 (Fig. 6) presses a tension roller 113 against the feed roller 110. The check tension roller 113 is carried between yoke arms 114 (Figs. 1, 6 and 11) journaled on a stud 115 on the printer frame 51. The spring 112 is attached to the free end of an arm 116, journaled on the stud 115, and secured to one of the yoke arms 114 supporting the tension roller 113. A manually operable tension release arm 117 projects from the other yoke arm 114. An arm 118 connected to the arm 116 by a yoke 119, operates to automatically relieve the tension of the roller 113, to disable the check feed, as will be described later.

*Slip feed mechanism*

When it is desired to print on a duplicate slip, such as that represented in Fig. 25, the slip is placed in the printing position on a slip table 120 (Figs. 1 and 6) suitably supported by rods (not shown) extending outwardly from the printer frame 51. The lower hammer 78 (Fig. 2) is then operated on the operation of the machine, to print once on the original slip and once on the duplicate, as described above. After the first impression is made on the slip, it is necessary to feed the slip into the position to receive the second impression on the duplicate, and, after this impression has been made on the duplicate slip, it is necessary to again feed the slip, so that the third impression may be made on the detail record strip.

The slip feed is effected by a knurled roller 121 (Figs. 1, 15, 17, 18 and 19) fast on a shaft 122, journaled in an arm 123 of a lever 124, and in an arm 125, connected by a yoke 126 to the arm 123. A gear 133 (Fig. 15) fast on the inner end of the shaft 122 meshes with a gear 134 journaled on a stud 132 projecting from the printer frame 51. A spring-pressed pawl 135 pivoted on a feed arm 137, journaled on the stud 132 and having a partial gear 136 (Figs. 14, 15 and 16) fast thereto, cooperates with a ratchet 138 fast to the gear 134. The partial gear 136 oscillates first counter-clockwise, as viewed in Fig. 15, to retract the pawl 135 and then clockwise, whereupon the pawl 135 being spring-pressed against the ratchet 138 drives said ratchet and gear 134 clockwise to rotate the gear 133, shaft 122 and feed roller 121 counter-clockwise, to feed the slip.

A spring-pressed dog 130 pivoted on a stud 131 cooperates with the ratchet 138 to prevent retrograde movement thereof.

To oscillate the partial gear 136, a rack 139 (Fig. 14) on the upper end of a vertically disposed reciprocatory slide 140 supported by two studs 141 and 142, on the printer frame 51, meshes with said partial gear 136. A stud 143 in an arm 144 of a rocking bell crank 145, pivoted on a stud 146 in the printer frame, enters a horizontal slot in the lower end of the slide 140.

A pair of cam plates 147 and 148 (Fig. 11) are journaled on a rod 149 supported between the machine side frame (not shown) and the printer frame 51, for the purpose of reciprocating the slide 140. These cams are pinned to a drive gear 445 (Fig. 1) journaled on the rod 149, and cooperate with two rollers 155 and 156 (Fig. 11) on the respective arms of a bell crank 157 pivoted on a rod 158 also mounted between the machine side frame 46 and the printer frame, to rock said bell crank first counter-clockwise in one movement, throughout its entire path of travel, and then clockwise back to normal in two distinct steps or movements with a slight interval between them, the two return steps or movements being necessary to provide for two feeding movements of the slip. A link 159 connects a downwardly extending arm 160 of the bell crank 157 with a lever 162 pivoted on the stud 146, previously mentioned. A spring 163 (Fig. 14) connected to an arm 165 of the bell crank 145 urges said bell crank 145 counter-clockwise, and normally presses a stud 164, on the bell crank 145, against the lever 162, said lever 162 being normally prevented from rocking by the cams 147 and 148.

But, when the cams 147 and 148 (Fig. 11) are rotated clockwise, as viewed in this figure, the bell crank 157 draws the link 159 towards the right, as viewed in Figs. 1 and 11, to rock the lever 162 counter-clockwise, and the spring 163 (Fig. 14) causes the bell crank 145 to follow the lever 162, thus raising the slide 140 and rotating the partial gear 136 and the pawl-carrying arm 137 in counter-clockwise direction, the pawl 135 moving idly over the teeth of the ratchet 138. As the cam 148 (Fig. 11), which is the slip feed cam, rotates clockwise, a rise 166 thereon wipes against the roller 156 of the bell crank 157, to rock the latter clockwise, and through the link 159, rocks the lever 162 (Fig. 14) also clockwise, whereupon the lever 162, through the stud 164 rocks the bell crank 145 clockwise to lower the slide 140, thereby rotating the slip feed roller 121 through the ratchet and gear described above, to feed the slip.

The first feed occurs just after the first impression is made on the slip and advances the slip into position to receive the second impression. In order that the slip may be stationary while the second impression is being made, the cam 148 (Fig. 11) is provided with a dwell 167. After this dwell, a second rise 168 again actuates the feeding mechanism to impart a second step of movement to the slip. The second step of feed discharges the slip from between the slip printing hammer and the type wheels to permit the third printing impression to be made on the detail record strip, which is retained in the machine. The detail record strip, having no bearing on the present invention, is neither illustrated nor described in this application.

It is not desired to operate the slip feeding mechanism on operations during which the items of a multiple-item transaction are entered in the machine, nor is it desired to operate the slip feed mechanism on the first cycle of total taking operations, whether there is a slip in the machine or not. To prevent the slip feeding mechanism from operating, one end of an arm 170 (Fig. 14) of a locking lever 171 pivoted on a stud 172 projecting from the frame 51, normally rests in the path of an ear 173 on the feed slide 140. Therefore, when the lever 162 is rocked counter-clockwise by the cams 147 and 148, the spring 163 cannot rock the bell crank 145 counter-clockwise because the slide 140 is blocked against upward movement by the arm 170, consequently the gear 136 and slip feeding pawl 135 remain in their normal positions. Means under the control of the total control lever 29 (Fig. 24), and also under the control of the single-item and multiple-item keys 505 and 506, is provided to rock the locking lever 171 counter-clockwise to displace the arm 170 from the path of the feed slide 140, to permit the spring 163 to shift the feed slide 140 upwardly to feed the slip when the machine is operated. The mechanism for controlling the locking lever 171 will be described later.

Slip tension

In order that the slip feed roller 121 (Figs. 15–18) may grip the slip to feed it, said roller is adapted to be brought into contact with another roller 169 mounted on the reduced end of a stud 175 on the printer frame 51. A spring 176 attached to the lever 124 carrying the feed roller 121, urges this lever in counter-clockwise direction. However, the lever 124 is normally restrained to hold the feed roller 121 away from its co-acting roller 169 by the nose of a pawl 178 pivoted on the lever 124, and resting against a stud 179 on an arm 180 swinging from the stud 132. The stud 179 passes through an opening in a depending arm 186 of a pitman 181, and supports the left end of said pitman, there being a clearance slot 187 in one end of the pitman 181, through which the stud 132 projects. The pitman 181 is also slidably mounted at its opposite end on the printer hammer drive shaft 74. A pair of cams 182 and 183 fast on the shaft 74 cooperate with a pair of rollers 184 and 185, respectively, on the pitman 181, and normally holds the pitman in its extreme left hand position, as viewed in Fig. 18. Just before the slip is to be fed between the first and second impressions, the cams 182—183 shift the pitman 181 towards the right to withdraw the stud 179 from the pawl 178, whereupon the spring 176 rocks the feed roller supporting lever 124 counter-clockwise to press the roller 121 against its co-acting roller 169, so that when the feed slide 140 is operated to rotate the roller 121, said roller will feed the slip forwardly, to locate the projecting upper end of the duplicate slip to position to receive the second printing impression.

After the second impression is made on the duplicate slip, the slip is discharged from between the printing hammer and the type wheels to permit the third impression to be made on the detail record slip. The cams 182—183 hold the pitman 181 in its right hand position until shortly before the third impression, just previously to which the cams shift the pitman towards the left. When this occurs, the stud 179 strikes the nose of the pawl 178, and thereby rocks the lever 124 clockwise against the tension of the spring 176 to lower the feed roller 121 from contact with its co-acting roll 169. The slip, having received its two impressions, is now free to be removed from the machine.

Slip feeler

When operating the present machine, it is desirable to print and issue either a single-item receipt, a multiple-item receipt, or to print on an inserted sales slip, but it is not desired to print on and issue a receipt and to print on an inserted slip at the same operation of the machine. Sensing mechanism is, therefore, provided in the present machine, under the control of the insertible slip, to disable the receipt issuing mechanism when an insertible slip is in the machine to be printed upon, or when the slip key (later described) has been depressed.

The sensing or slip feeling mechanism includes a feeler finger 190 (Figs. 1, 6 and 10), pivoted on a stud 191 threaded in a bracket 192 (Fig. 16) supported by the stud 132 and other means (not shown). A spring 193 normally holds the feeler finger in retracted position in which an ear 194 on the feeler finger rest on a lifter finger 195 formed on the free end of an angular lever 196 pivoted on a stud 197 projecting from a bracket 198 supported by the hammer drive shaft and the stud 72.

A hub 202 (Fig. 20) journaled on the stud 197 connects the pivoted end of the lifter lever 196 with an arm 201 spaced apart from and lying parallel with the lever throughout a part of the length of the lever, to cooperate with the lever in supporting a roller 200 mounted on a pin extending between and connecting the outer end of the arm 201 and the lever 196. A spring 199 urges the angular lifter lever 196 in clockwise direction, thereby holding the roller 200 in cooperative relation with the periphery of a cam 203 (Fig. 10) fast on the printer drive shaft 74. This shaft, and consequently the cam 203 make one complete clockwise rotation (Fig. 6) at each operation of the machine. The cam 203 is so formed that shortly after the beginning of the operation of the machine, it permits the spring 199 to rock the lifter lever 196 in clockwise direction, thereby lifting the finger 195 to rock the feeler finger 190 counter-clockwise. If no slip is in the printing position, the feeler finger 190 continues its counter-clockwise movement, permitting the continued clockwise movement of lifter finger 195 and of the lever 196 until the lever 196 is stopped by the roller 200 contacting the low portion of the cam 203. The parts remain in the moved positions until the lever 196 is restored by the cam 203 near the end of the operation of the machine. When the lifter lever 196 is restored, the spring 193 lowers the feeler finger 190, thus holding the ear against the finger 195 of said lever 196.

However, if a slip is on the table 120 in position to be printed upon, the feeler finger 190 on its upward travel, encounters, and is arrested by the slip, thereby arresting the clockwise rotation of the lifter finger 195 and its lever 196.

It now becomes necessary, to prevent mutilation of the slip, to withdraw the feeler finger 190 from contact with the slip before the slip is fed forwardly to receive the second impression. Mechanism, therefore, is employed to restore the feeler finger 190 and the lifter lever 196 when the feeler finger 190 encounters a slip on its upward movement. This mechanism is best shown in Fig. 10.

One arm of a lever 204 (Fig. 10) journaled in a stud 205 in the bracket 198, carries an anti-friction roller 206. A coil spring 207 constantly urges the lever 204 in clockwise direction to hold the roller 206 in cooperative relation with the periphery of a feeler-restoring cam 208 fast on the shaft 74 and adapted to turn through one complete clockwise rotation therewith at each operation of the machine.

The remaining arm of the lever 204 carries a spring-pressed by-pass pawl 209. On its clockwise rotation, the cam 208 rocks the lever 204 counter-clockwise early in the operation of the machine, and then, near the end of the operation, permits the spring 207 to rock the lever 204 clockwise to its normal position. The lifter lever 196 carries a stud 215, which, on operations when a slip is in printing position, thereby limiting the movement of the feeler finger 190 and lever 196, assumes a position in the path of the pawl 209 so that when the cam 208 rocks the lever 204 counter-clockwise, the pawl 209 strikes the stud 215 and rocks the lifter lever 196 counter-clockwise to its normal position, thus permitting the spring 193 to draw the feeler finger 190 away from contact with the inserted slip which is then free to be fed without injury thereto.

The by-pass pawl 209 is used for the following reasons:

When the machine is operated with no slip in the printing position, the spring 199 rocks the lifter lever 196 throughout its entire path of travel and in so doing, positions the stud 215 above the path of the pawl 209, and when the cam 208 rocks the lever 204 counter-clockwise, the nose of the by-pass pawl 209 assumes a position beneath the stud 215. As the cam 201 rocks the lifter lever 196 counter-clockwise to its normal position before the cam 208 permits the spring 207 to restore the lever 204 to its normal position, the stud 215 on its counter-clockwise movement encounters the tail of the by-pass pawl 209 and wipes by the pawl which is immediately restored to its normal position by its spring 216. A stud 217 on the lever 204 limits the counter-clockwise movement of the by-pass pawl 209.

As stated above, it is not desired to issue a check or receipt on operations when an inserted sales slip is to be printed upon. The check feed roller 110 (Figs. 6 and 11), however, operates at each operation of the machine regardless of whether or not not it is desired to issue a check. Mechanism, therefore, is provided, which may be operated to remove the check tension roller 113 (Fig. 6) from contact with the check feed roller 110. When no slip is present in the machine, and it is desired to issue a check or receipt, mechanism controlled by the slip feeler finger 190 operates to disable the check tension release mechanism.

To this end, a lever 218 (Figs. 6 and 7) pivoted on rod 72 carries two anti-friction rollers 219 and 220 cooperating with a pair of cams 221—222, respectively, fast on the shaft 74. A link 223 (Fig. 6) pivoted at one end to the lever 218, is supported near its other end by a stud 225, on the frame 51, entering a slot 224 in the link. The link 223 has a notch or recess 226 through which projects a stud 227 carried by a bell crank 228 pivoted on a stud 235 on the frame 51. The bell crank 228 also operates an ink ribbon feeding mechanism, not shown herein as it has no particular relation to the present invention. The stud 227 also projects through a cam slot 236 in a bell crank 237 pivoted on a stud 239 on the printer frame 51. The bell crank 237 carries a stud 241 to cooperate with a shoulder 242 on a link 243 pivoted at 250 to an arm 244 of a multi-armed lever 245 journaled on the outer type wheel sleeve 34. Another arm 246 of the multi-armed lever 245 is bifurcated to embrace a stud 247 carried by the arm 118 connected to the check tension spring arm 116 through the yoke 119. A spring 255 normally holds the link 243 in contact with the stud 241 with the shoulder 242 in cooperative relation with the stud 241.

The shaft 74, and consequently cams 221—222, make one clockwise rotation at each operation of the machine to rock the lever 218 first clockwise and then counter-clockwise to normal. On its clockwise movement, the lever 218 draws the link 223 towards the right which, through the slot and stud connection 226, 227, rocks the bell crank 228 counter-clockwise and swings the stud 227 to the right, and the stud 227, through its engagement with the cam slot 236, rocks the bell crank 237 with its stud 241 counter-clockwise. The stud 241, in turn, draws the link 243 towards the right and locks the multi-armed lever 245 counter-clockwise. This movement of the lever 245 and its arm 246 rocks the arms 118 and 114 clockwise against the tension of the spring 112 and lowers the tension roller 113 out of contact with the check feed roller 110. With the rollers 110 and 113 thus separated, the check web will not be fed forwardly when, during the operation of the machine, the roller 110 is rotated for that purpose. As will be hereinafter described, the counter-clockwise movement of the multi-armed lever 245 also disables the item and total hammers on operations wherein a slip is encountered by the slip feeler finger 190 on its upward movement.

As stated above, when no slip is in printing position, the check tension disabling device is rendered ineffective so that a check will be issued on such operations. To this end the slip feeler finger 190 controls means to disconnect the link 243 from the stud 241, thereby preventing the tension roller 113 from being shifted out of contact with feed roller 110.

A stud 256 (Fig. 6) on the arm 201, enters a cam slot 259 in an arm 260 journaled on the shaft 74. A yoke 261 (Fig. 9) connects the arm 260 with an arm 262 also journaled on the shaft 74. A stud 263 on the arm 262 enters a notch in an arm 264 pivoted on a stud 265 on the printer frame 51. A yoke 266 connects the arm 264 (Fig. 6) with an arm 267 also pivoted on the stud 265. A link 268 pivoted to the arm 267, extends upwardly and is guided at its upper end by a slot 269 therein surrounding a stud 275 in a lever 276 pivoted on the stud 239.

When the feeler finger 190, on its upward movement, finds no slip in the printing position, it continues its upward travel, as described above, thereby permitting the spring 199 to rock the lifter lever 196 farther in clockwise direction. This extended travel of the lifting lever carries the stud 256, traversing the cam slot 259 rocks the arm 260, yoke 261, and arm 262 clockwise, whereupon the arm 262, through the stud 263, rocks the arm 264, yoke 266 and arm 267 in counter-clockwise direction, thus moving the link 268 longitudinally upward relatively to its guide stud 275. A stud 278 (Figs. 6 and 8) in the link 243 normally occupies a position immediately above the upper end of link 268, so that when said link is raised, as just described, when no slip is in the machine, the upper end thereof contacts the stud 278 and rocks the link 243 counter-clockwise about its pivot 250 on the arm 244 to raise the shoulder 242 out of the path of stud 241 on the bell crank 237, thus rendering the counter-clockwise movement of said bell crank 237 ineffective, and the link 243 will not be drawn toward the right, as viewed in Fig. 6. Consequently, the tension roller 113 will not be withdrawn from the roller 110, and the spring 112 continues to press the roller 113 against roller 110, thus gripping the check web so that when the feed roller is rotated, the check will be fed the proper distance.

But, when a slip occupies its proper position in the machine, and the spring-actuated feeler finger 190 moves upwardly until it contacts, and is arrested by said slip, this slight movement allowed the lifter lever 196 is not sufficient to enable the lever to move the stud 256 out of the lower portion of the cam slot 259, and since this lower part of the slot is concentric with the pivot point of the lifter lever 196, the arm 260 and link 268 are not actuated and the stud 241 is not disconnected from the link 243. Now when the lever 218, through the stud 227, rocks the bell crank 237 counter-clockwise, the bell crank draws the link 243 towards the right to lower the tension roller 113, thereby disabling the check feed when a slip is to be printed upon.

On multiple item operations, the operator sometimes holds the slip in his hand or places it where it is convenient to read the amounts of the various items while he operates the machine to enter the items. When all of the items have been entered, the operator then places the slip in position on the slip table 120 before operating the machine to take the total of the items he has just entered. In this manner, the total only of the items is printed on the inserted slip. On multiple-item operations, however, it is not desired to issue a check, but since the slip is not in place in the machine until just before a total taking operation, it is necessary to provide other means to disable the check tension means, and also to disable the item and total printing hammers.

Such check tension disabling means includes a manually operable "slip" key 280 (Figs. 1, 8 and 17) pivoted on a stud 281 on the printer frame 51. This "slip" key is equipped with the usual key head 282 bearing a legend designating the purpose of the key. A link 283 connects the "slip" key 280 with an arm 284 of the lever 276, which, it will be recalled, carries the guide stud 275 for the check tension release disabling link 268.

Depression of the "slip" key 280 draws the link 283 towards the left and rocks the lever 276 counter-clockwise, which, through the stud 275, swings the upper end of the disabling link 268 to the right, as viewed in Figs. 6 and 8, from its position beneath the stud 278 in the link 243. Consequently, when the disabling link 268 is raised, as above described, it passes idly to the right of the stud 278, permitting the shoulder 242 on link 243 to remain in the path of the stud 241 on bell crank 237 so that when the bell crank 237 is rocked, it is effective to withdraw the check tension roller 113 from contact with the check feed roller 110, thus disabling the check feed mechanism.

A spring-pressed aligner 285, pivoted on a stud 286 in the printer frame 51, cooperates with one of two notches in the "slip" key 280 to align said key in either its depressed or its undepressed position.

The end walls of a recess 287 formed in the body of the "slip" key 280 contact with a stud 289 projecting therethrough from the frame 51 to limit the rocking movement of the key 280.

Provision is made to prevent restoration of the "slip" key 280 to its undepressed position after it has been depressed, and before the machine is operated. That is to say, mechanism is provided to compel operation of the machine after the "slip" key 280 is depressed, before said key may be restored to its normal undepressed position.

When the "slip" key 280 is depressed and the link 283 is thereby drawn to the left to rock the lever 276, the pivot stud 290, connecting the link 283 with the lever 276, projects into a notch formed in a latch lever 288 pivoted on a stud 295 in the printer frame 51. Hence, the link 283 rocks said latch lever 288 clockwise to position a shoulder 296 thereon from beneath the free end of a dog 298 journaled on a machine release shaft 299. As the shoulder 296 escapes the end of the dog 298, a spring 300 snaps the dog down in front of the shoulder, thereby preventing counterclockwise movement of the latch lever 288 which, through the link 283, holds the "slip" key 280 depressed until the dog 298 is disengaged from the shoulder 296, which disengagement is accomplished in the following manner:

The shaft 299, journaled in the machine side frames, is the usual release shaft provided in machines of this type, and is first rocked clockwise to release the machine for operation, and then near the end of the operation, it rocks counter-clockwise past normal position for the purpose of releasing the depressed amount keys (not shown), after which the shaft is rocked clockwise to its normal position. The mechanism for rocking the shaft 299 will be described later. On its clockwise, or machine releasing movement, the release shaft 299 does not affect the dog 298 which has previously dropped in front of the shoulder 296 upon depression of the key 280. However, when, near the end of the operation of the machine, the release shaft 299 rocks counter-clockwise past its normal position to release the depressed amount keys, (not shown), an ear 301 on an arm 302 fast on the release shaft 299, picks up the dog 298 and rocks it out of the path of the shoulder 296, whereupon the spring 300 rocks the lever 288 counter-clockwise, which, through the stud 290 and link 283, rocks the depressed "slip" key 280 to its normal position. Means, to be described later, is provided to positively lock the "slip" key 280 against release, when depressed, or against depression, if not depressed, during the registration of a plurality of items comprising a multiple-item transaction.

However, if the slip key 280 is depressed, said key may be released through the means which releases any depressed amount keys before the machine has been released for operation. It will be remembered that when the key 280 (Fig. 1) is depressed, the dog 298 snaps in front of the shoulder 296 of the lever 288 to temporarily retain the key 280 in depressed position. But, if the shaft 299 is manually rocked counter-clockwise by a lever 507 (Fig. 28), having a handle 508 protruding through the cabinet of the machine, the ear 301 (Fig. 1) on the arm 302 raises the dog 298, and the spring 300, through the stud 290 and link 283, rocks the depressed key 280 to its normal undepressed position.

The shaft 299 is manually rocked by the lever 507, a stud 472 mounted thereon striking an arm 471 rigid with the arm 459 secured to the shaft 299.

The lever 507 is held in its normal position shown in Fig. 28 by a spring 509 attached at its upper end to a stud on the lever 507, and at its lower end on a stud mounted on a link 510. A slot 512 in the link 510 fits over an eccentric of a lock barrel 511 to guide the movement of the latter. A stud 513 carried on the link 510 limits the clockwise movement of the lever 507.

The lock barrel 511 is provided to lock the shaft 299 against releasing movement but forms no part of the present invention, and therefore, no further reference will be made thereto. For a detailed description reference may be had to the previously mentioned Shipley application, Serial No. 687,305.

Mechanism, controlled by the slip feeler finger 190, is provided to prevent reciprocation of the slip feed slide 140 (Fig. 14), thus preventing the slip feed roller 121 from operating when the machine is operated with no slip in printing position.

This mechanism is best shown in Figs. 6, 8 and 14, and includes a link 303 (Figs. 6, 8, 11 and 14) pivoted to the arm 267 (Fig. 6), previously mentioned. A stud 304 (Figs. 8 and 14) on the free end of the link 303 enters an opening 305 in the printer frame 51. The link 303 is shiftable back and forth with the lifter lever 196 under the control of the insertible slip as has been described above. In its reciprocatory movement, the stud 304 slides back and forth on the bottom of the opening 305. On the forward movement of the link 303, a stud 306 (Fig. 14) thereon strikes the upper end of a lever 307 pivoted on a stud 309 on the frame 51, and rocks the lever counter-clockwise to slide the nose of a latch 310, pivoted to the lower end of the lever 307 and slidably supported on a stud 312, into a recess formed in the side of the slip feeding slide 140. With the feeding slide 140 thus latched against movement, the slip feed roller 121 can not be rotated when the cams 147—148 (Fig. 11) rock the lever 162 (Fig. 14) as above described.

When, near the end of the operation of the machine, the cam 203 (Fig. 6) rocks the lifter lever 196 downwardly, and through the leverage described above, rocks the arm 267 clockwise, the link 303 is drawn toward the right to withdraw the stud 306 (Fig. 14) from the edge of the lever 307, whereupon a spring 315 rocks the lever 307 clockwise to withdraw the latch 310 from the notch in the check feed slide 140, thereby freeing the slide for operation.

Control of printing hammers by slip feeler

When a slip is to be printed upon and no check is to be issued, as above described, it is desirable to prevent operation of the check printing hammers. This is accomplished through the control of the slip feeler mechanism by the insertible slip in the following manner:

The lifter link 268 (Fig. 6), it will be recalled, remains in its lowered position when an inserted slip obstructs the upward movement of the slip feeler finger 190. With the link 268 in its lowered position, the shoulder 242 remains in cooperative relation with the stud 241 on the bell crank 237, so as to enable the link 243 to rock the multi-armed lever 245 slightly counter-clockwise upon operation of the machine to separate the check tension roller 113 from the check feed roller 110. A flange 313 (Figs. 2, 5 and 11) on an arm 314 of the multi-armed lever 245 is adapted, when the lever 245 rocks counter-clockwise, to engage a hooked shoulder 251 (Fig. 27), on an arm 320 (see also Fig. 5) secured to and depending from the item hammer 42. The flange 313 is also adapted to engage a similar shoulder 308 of an arm 321 secured to the total hammer 43 (Figs. 2, 3 and 5). Thus, when there is a slip in the machine and the multi-armed lever 245 is rocked to retract the check tension roller 113, as above described, to prevent issuance of a check, the flange 313 engages the shoulders of the arms 320 and 321 to latch the item and total hammers 42 and 43 respectively, thus preventing them from being cocked and operated during slip printing operations. Concentric edges 316 of the arms 320 and 321 move in grooves cut in a stud 317 projecting from the frame 51 to guide the hammers 42 and 43 when they are raised and lowered to take the impressions.

The control of the slip printing hammer 78 through the slip feeler finger 190 is effected in a different manner. It will be remembered that when no slip is in printing position in the machine, the stud 256 on feeler lifter arm 201 (Fig. 6), moves upwardly in the cam slot 259 in the arm 260 (Figs. 6 and 9) to rock this arm 260 clockwise. When this occurs, the upper edge 258 of the arm 262, which arm, it will be recalled, is connected to the arm 260 by the yoke 261, rocks underneath the stud 83 on the slip printing hammer arm 79 to prevent operation thereof.

Control of printing hammers by total control lever

Additional means is provided to disable the item printing hammer 42, the total printing hammer 43, and also the slip printing hammer 78, on the first cycle of a total taking operation. On such operations it is necessary that the machine make two complete cycles of movement, instead of one as on adding operations. These two cycles are required owing to the particular construction of the type of cash register to which the present invention is shown applied. This register is not shown here and it is not thought necessary to include a description or discussion of the totalizing mechanism for said register, other than to state that mechanism amply illustrated and described in the above referred to Shipley applications, is provided, which, under control of the total lever 29 (Fig. 24), causes the machine to operate continuously through two cycles of operation when a total or sub-total is to be taken from a selected totalizer.

The total control lever 29 (Fig. 24) is pivoted on a stud 335 suitably supported on the machine side frame, and has a plurality of positions to which it may be adjusted to control the register in the performance of its various operations, such as, adding, total taking and sub-total taking. Movement of the total lever 29 from its adding to any one of its total or sub-total positions, sets up a condition whereby all of the hammers are crippled, or rendered inactive, on the first cycle of the total or sub-total taking operation.

A convenient mechanism, under the control of the total control lever 29, for disabling the item printing hammer, total printing hammer and slip printing hammer, will now be described.

A hammer control lever 322 (Figs. 3 and 5) journaled on the largest type-carrier tube 34, carries a flange 323 to cooperate with a stud 325 on an arm 326 secured to the lower or slip printing hammer 79. A flange 330 (see also Fig. 29), on the upper end of the hammer control lever 322 has an extension 327 which cooperates with a stud 329 (Fig. 5), projecting laterally from the arm 320 secured to the item hammer 42 (Fig. 29). The flange 330 cooperates with a stud 331 on the arm 321 (Figs. 2, 5 and 29), secured to the total printing hammer 43. The extension 327 which cooperates with the stud 329 on the arm 320 of the item hammer 42 is shorter than the oppositely-extending flange 330 cooperating with the stud 331 on the arm 321 of the total hammer 43, the two studs 329 and 331 being spaced apart from each other, and extending laterally toward each other. The hammer control lever 322 extends into the space between the two studs 329 and 331 on the parallel arms 320 and 321 of the upper printing hammers 42 and 43.

When the total lever 29 is in its "add" position, for all operations, except a single-item transaction, the flange 323 cooperates with the stud 325 on the slip hammer bracket 326 to prevent operation of the slip printing hammer 78. Also, the flange 330 cooperates with the stud 331 to prevent operation of the total printing hammer 43, but the extension 327, being shorter than flange 330, does not lie above the stud 329, and consequently, the item printing hammer 42 is free to operate on adding operations, subject, however, to other controls later described.

When the total control lever 29 (Fig. 24) is adjusted to one of its total or sub-total taking positions, a cam slot 332 acting on a stud 333 on a lever 334 pivoted at 341, rocks the lever 334 counter-clockwise. An arm 342 also pivoted at 341 is held in cooperative relation with an arm 343 of the lever 334, by a spring 343 to form in conjunction therewith, a cam slot 344 through which projects a stud 345 on an arm 346 fast on a shaft 347 extending across the machine between the right side frame 348 (Fig. 21), and the left side frame 46.

The counter-clockwise movement of the lever 334 operates through the cam slot 344 to rock the arm 346 and shaft 347 slightly clockwise, and with them a lever 351 (Figs. 12 and 13), fast on the shaft 347 near the printing mechanism, to slide a link 350 pivoted thereto, in the direction of its length towards a shaft 352 supported in the printer side frame 51 and in the left side frame 46 of the machine.

The link 350 carries a roller 353, which, upon the movement of the link towards the shaft 352, cams an arm 354 fast on the shaft 352, and said shaft slightly clockwise. A stud 355 on an arm 356 (Fig. 14) fast on the shaft 352, projects between a pair of arms 357 and 358 (Figs. 14 and 19) journaled on the shaft 352 and pressed together against the stud 355 by a spring 359. A stud 365 on a lever arm 366 pivoted on the shaft 352 also projects between the pivoted arms 357 and 358. Clockwise movement of the shaft 352 and of the arm 356, fast thereon, is transmitted by the stud 355 (Fig. 14) to the arm 357, thence through the spring 359 to the arm 358, which contacts the stud 365 to rock the lever arm 366. A stud 368 on the arm 369, rigid with the lever arm 366, enters a slot 370 (Fig. 3) in the hammer control lever 322, whereby the clockwise movement of the lever arm 366 is transmitted to said control lever 322 to rock it counter-clockwise. The counter-clockwise movement imparted to the lever 322, by the total control lever 29 from its "add" position to one of its "total" or "sub-total" positions, does not move the flanges 323 and 330 (Fig. 5) out of cooperative relation with their respective studs 325 and 331 on the arms 326 and 322, respectively. Therefore, the total printing hammer 43 and the slip printing hammer 78 will be disabled on the first cycle of a total taking operation. However, the extension 327 on the flange 330, which normally occupies a position out of the path of its stud 329 on the arm 320, is shifted by the movement of the total control lever 29, into its effective position above the stud 329, to prevent upward movement thereof, to thereby disable the item printing hammer 42 on the first cycle of the total taking operation.

After the total, which has been taken from the selected totalizer, is set up on the type wheels, it is desired to print the amount of the total on the issuing check or receipt, or on the insertible slip, and therefore, it is necessary to render effective all of the printing hammers on the second cycle of total taking operations. This is accomplished by rocking the shaft 352 (Figs. 2, 3, 12 and 13) and its associated mechanism, an additional distance in clockwise direction to carry the flanges 323 and 330 and the extension 327 of the latter flange counter-clockwise out of the paths of their respective studs 325, 331 and 329, thereby freeing the slip printing hammer 78, the item printing hammer 42 and the total printing hammer 43 for operation.

The mechanism for giving the shaft 352 its additional movement is illustrated in Fig. 21. A stud 371 in a slotted pitman 372 slidably mounted on a stud 373 projecting from the frame 348, extends into a cam groove 374 in a cam disk 375 journaled on the stud 373. The stud 371 normally occupies a recess formed in the inner wall of the cam groove 374, and is adapted to be withdrawn therefrom into the groove 374 so that rotation of the cam disk 375 will actuate the pitman 372. A lever 378 pivoted on a stud 379 projecting from the machine side frame 348, is pivotally connected at one end to the pitman 372, and a link 380 connects the other end of the lever 378 to an arm 382 fast on the shaft 347.

It will be remembered that movement of the total control lever 29 from its "add" position, in which it is shown in Fig. 24, to any one of its totalizing positions rocks the shaft 347 slightly clockwise. This movement of the shaft 347, through the link 380 and lever 378, draws the pitman 372 towards the left, as viewed in Fig. 21, to withdraw the stud 371 from its recess into the cam groove 374. When the pitman 372 is moved towards the left by the adjustment of the total control lever 29, a pair of studs 383 on the pitman 372 straddling an ear 384 on a coupling slide 390, carries the coupling slide therewith to insert the left end thereof in a recess 391 in a large gear 392 journaled on the stud 373 to connect said gear and the cam disk 375 so that they shall rotate in unison. The gear 392 is given one-half of a counter-clockwise rotation on each adding operation of the machine, but is controlled to make one complete rotation in the same direction on each totalizing operation of the machine. The gear 392 is driven from the main drive shaft 514 (Fig. 31), of the machine by gearing (not shown), the operation of which is fully disclosed in the Shipley applications mentioned above, Serial Number 608,281, filed December 21, 1922, and Serial Number 687,305, filed January 19, 1924.

Near the end of the first cycle of a total taking operation, the cam groove 374 imparts an additional movement towards the left to the pitman 372. Then, near the end of the second cycle, the cam disk 375 draws the pitman 372 towards the right to its intermediate position.

The additional movement of the pitman towards the left, through the lever 378 link 380 and arm 382, rocks the shaft 347 farther in clockwise direction, and moves the link 350 (Figs. 12 and 13) farther towards the right to cam the arm 354 and shaft 352 farther in clockwise direction, which through the arm 356 (Fig. 14) and stud 355, rocks the arm 357 an additional distance in clockwise direction. This second movement of the arm 356, through the spring connection 359, would ordinarily rock the arm 358 and lever arm 366 therewith, but before this occurs, the cams 182 and 183 (Fig. 18) draw the pitman 181 towards the right and position a tail 393, carried by said pitman, under the stud 368 in the arm 369, to restrain the lever arm 366 and arm 358 against the pull of the spring 359. This serves to hold the hammer control lever 322 (Figs. 2, 3 and 5) in such a position that the flanges 323, and 330 and extension 327 are effective to prevent operation of any of the hammers.

Just before the end of the first cycle of a totalizing operation, the cams 182 and 183 slide the pitman 181 back to its left hand position, thereby releasing the lever arm 366 and arm 358 to the action of the spring 359 which instantly rocks these arms clockwise, thereby rocking the hammer control lever 322 counter-clockwise to remove the flanges 323 and 330 and extension 327 from their effective position to their ineffective position. The item, total and slip printing hammers are, therefore, free to operate on the second cycle of a totalizing operation.

However, all the printing hammers operate under the control of the insertible slip, that is, even though the hammer control lever 322 determines that all printing hammers may be operated, yet, if a slip is placed in the proper position in the machine, the item and total printing hammers 42 and 43 are disabled, but the slip hammer 78 operates, and if there is no slip in the machine, the item and total printing hammers are effective and the slip printing hammer 78 is disabled as above described.

Control of printing hammers by keys

It has been stated above that when the items of a multiple-item transaction are being entered in the machine, it is desirable to disable the total printing hammer 43 and the slip printing hammer 78, leaving the item printing hammer 42 free to operate. This is accomplished by positioning the hammer control lever 322 under the control of the multiple-item keys 505 (Fig. 31). A cam arm 394 (Figs. 12, 13 and 31) journaled on a stud 395 suitably supported in the machine, is adapted to be differentially positioned under the control of two or more groups of keys 505 and 506 in a manner hereinafter described. One group of these keys is known as the single-item keys 506, and the other group as the multiple-item keys 505. The cam arm 394 is provided with peripheral edges 396 and 397 of different radii to cooperate with a roller 398 on a slotted arm 399 journaled on the shaft 352. A stud 400 on one end of a link 401 pivoted at its opposite end to an arm 402 of the lever 351, projects through a slot in an arm 403 fast on the shaft 352 and through the slot in the arm 399.

When the cam arm 394 is differentially adjusted under the control of the multiple-item keys 505, the low sector 396 of the cam arm 394 is rocked into cooperative relation with the roller 398. Therefore, when this condition exists, the parts illustrated in Fig. 12 remain in the positions in which they are shown in this figure. In this case, the hammer control lever 322 is not disturbed, and remains in the position in which it appears in Fig. 3. In this position of the parts, the flange 323 (Fig. 5) is effective to prevent operation of the slip printing hammer 78 and the flange 330 is effective to prevent operation of the total printing hammer 43, however, the extension 327 being shorter than the flanges 323 and 330 permits operation of the item printing hammer 42. Nevertheless, on item entering operations, if a slip is in its proper position in the machine, the multi-armed lever 245 (Figs. 2 and 11) is rocked by the mechanism shown in Fig. 6 to disable the item printing hammer 42 and the total hammer 43, as heretofore explained.

When the transaction comprises a single item, it is desired that both the item and the total printing hammers function to print their respective data on the issuing check. On such operations, the outer edge 397 (Figs. 12 and 13) of the cam arm 394 is differentially brought into cooperative relation with the roller 398 under the control of the single-item keys 506. Movement of the cam arm 394 to position the high sector 397 thereof under the roller 398 rocks the arm 399 clockwise, and through the stud 400 projecting through the slot in this arm and through the slot in the arm 403, rocks the latter arm clockwise.

As the arm 403 is fast to shaft 352, this shaft, and consequently the hammer control lever 322 are rocked to shift all of the flanges 323 and 330 and extension 327 (Figs. 2, 3, 5 and 29) from the paths of their respective studs 325, 331 and 329, to enable the operation of all of the printing hammers. However, the hammers are still under the control of the insertible slip as described above, that is, a slip in the proper printing position disables the item and total printing hammers 42 and 43, the slip printing hammer 78 being free to operate, and, if no slip is in the machine, the item and total printing hammers are free to operate, but the slip printing hammer is automatically disabled, as above described.

After the slip printing hammer 78 has operated to make an impression, the stud 83 (Fig. 2), under the influence of the spring 90, rests on the arm 81 of the hammer operating lever 82. In this position of the hammer, the stud 325 (Fig. 3) is in the path of the control flange 323, and before said flange can be rocked beneath the stud 325 to disable the hammer, it is necessary to slightly raise the hammer. This is accomplished by a hook-shaped cam arm 410 (Fig. 3) cooperating with a stud 411 on the rear end of the hammer arm 79. A stud 412 on an arm 413 connected by a yoke 414 to the cam arm 410, projects through a slot in the rear end of the pitman 181 (see also Fig. 18). The hooked cam arm 410 normally holds the stud 83 raised slightly above the arm 81.

When the cams 182—183 slide the pitman 181 toward the right, the pitman, because of the slot and stud connection 412, rocks the arm 413, yoke 414, and cam arm 410 clockwise, whereupon the spring 90 (Fig. 2) lowers the hammer 78 until the stud 83 rests on the arm 81 of the hammer operating lever 82. The hammer is then operated to take the impression, and after the last impression is made, the stud 83 remains resting on the arm 81 until the cams 182—183 move the pitman 181 towards the left, which rocks the arm 413 and cam arm 410 counter-clockwise. The shape of the cam arm 410 is such that this latter movement rocks the hammer arm 79 clockwise, thereby raising stud 325 to permit the flange 323 to be positioned thereunder, as heretofore described.

A similar condition also exists in connection with the item and total hammers 42 and 43.

After the hammers have made their impressions, the springs 58 draw the studs 57 upwardly into contact with the arms 55 of the hammer operating levers 56, which positions the studs 329 and 331 (Figs. 2, 3 and 5) in the paths of the flanges 327 and 330. It is, therefore, necessary to lower these studs to permit the flanges 327 to 330 to move into their restraining positions above said studs to prevent the hammers from being drawn upwardly to make the impressions. A stud 360 (Fig. 4) on an arm 361 projecting rearwardly from one arm 362 (Fig. 2) of a pair of such arms pivoted on the stud 50 and supporting the bail 363 (see also Fig. 27), enters a cam slot in an arm 364 pivotally supported in the machine and adapted to be rocked first clockwise and then counter-clockwise to normal by any suitable means (not shown).

On its clockwise movement, the arm 364, through the cam slot therein acting on the stud 360, rocks the bail 363 (Fig. 27), clockwise to release the item and total printing hammers to the action of their operating mechanisms. After the hammers have been operated to take the impression, the springs 58 draw the hammers upwardly until the studs 57 rest against the arms 55, in which positions of the hammer, the studs 329 and 331 lie in the paths of the flanges 327 and 330. Near the end of the operation, the arm 364 is rocked counter-clockwise to normal and the cam slot therein rocks the bail 363 counter-clockwise, which picks up the tails 66 on the hammer arms 44 and 45 to rock said arms counter-clockwise to lower the studs 329 and 331 below the paths of flanges 327 and 330 so that these flanges are free to be moved to control the item and total printing hammers on the next operation, as described above.

*Transaction bank and differential mechanism*

It has been stated above that the cam arm 394 (Figs. 12, 13 and 31) is adapted to be differentially positioned under the control of the multiple item keys 505, and the single item keys 506, to control the disabling of the total printing hammer 43, and the slip printing hammer 78, and leave the item printing hammer 42 free to operate. The mechanism controlled by the keys 505 and 506 to effect this differential setting of the cam arm 394 will now be described.

The two groups of keys (Fig. 31), namely, the multiple item keys 505, and the single item keys 506, are slidably mounted in a key frame 520 supported by rods 521 and 522, carried by the side frames 46 and 348. Springs 523 normally maintain the keys in their undepressed positions. When a key is depressed, the usual detent 525 catching over a stud 524 projecting laterally from the key, latches the key in depressed position.

The depressed key 505, or 506, determines the position to which a differentially movable arm 526, pivoted on a stud 527, is moved. The differential arm 526 is latched to a driver 528 by a latch 529 supported by a bell crank 530 and a link 531, both being pivoted on the differential arm 526. The driver 528 is actuated by a pair of cams 541 pivoted on the main cam shaft 514. A lever 542 pivoted on a stud 532 is provided with a pair of rollers 533, cooperating with the cams 541 to rock the lever 542 first clockwise and then counter-clockwise. A link 543 connects the driver 528 with the upper end of the lever 542 to operate the driver 528 first clockwise and then counter-clockwise.

Clockwise movement of the driver 528 carries the differentially movable arm 526 clockwise until the outer end of the bell crank 530 strikes the depressed key, whereupon the latch 529 is disconnected from the driver 528, thus arresting the differential arm 526 and permitting the driver to complete its movement.

During the counter-clockwise movement of the lever 542, when the driver 528 is returned to its home position, the latch 529 becomes connected to the driver and the differential arm 526 is restored to its normal position.

A beam 535 is pivoted to the differential arm 526 at 536, and the forward end thereof is adjusted according to the value of the key depressed. The free end of the beam 535 is bifurcated to embrace a stud 537 on a link 538 connected at its upper end to an arm 539 pivoted on a shaft 540. The arm 539 is provided for adjusting indicators which form no part of the present invention, and therefore, no further reference is made thereto.

The lower end of the link 539 is pivoted to an arm 545 secured to a shaft 546 extending through and beyond the left side frame 46. A roller 547 on the lever 542 wipes along the lower edge 548 of the beam 535 to adjust the bifurcated end of the beam according to the setting of the differential arm 526, thereby setting the link 538 and arm 545 in a position corresponding to the key depressed.

The differential movement given the arm 545 is transmitted to a segment 550 (Fig. 31) by the shaft 546. The segment 550 meshes with a segment 551, pivoted on the stud 395, and is secured to the side of the cam arm 394. Thus any differential movement given the link 538 by the beam 535, as controlled by the differentially movable arm 526, is transmitted to the differential cam arm 394 by the segments 550 and 551.

Therefore, when the single item keys 506 control the positioning of the differential arm 526 the edge 397 (Fig. 12) of the cam arm 394 is moved beneath the roller 398 to rock the shaft 352 to its fullest extent, as has been heretofore described.

When the differential arm 526 is controlled by a depressed multiple item key 505, the edge 396 of the cam arm 394 is moved beneath the roller 398 to limit the movement of the shaft 352 as heretofore described.

*Control of the slip feed by the total lever*

The slip feeding mechanism is also under the control of the total control lever 29, and of the single-item and multiple-item keys 505 and 506. The slip feed is disabled when there is no slip in the machine, as described above. However, even with a slip in the proper printing position, it is not desirable to print on the first cycle of totalizing operations, nor to print the items of a multiple-item operation thereon, and the slip printing hammer 78 is disabled, as above described, on such operations.

Therefore, means are provided to prevent the slip feeding mechanism from functioning on such operations. It will be remembered that the arm 170 of the lever 171 (Fig. 14) normally rests above the ear 173 on the slip feed slide 140. This arm 170 is shifted out of the path of the ear 173, on the second cycle of total taking operations and on single-item operations. The stud 368 (Figs. 2, 3 and 4) on the arm 369, which projects through the slot 370 in the hammer control lever 322, also enters a slot 404 (Fig. 14) in the lever 171. It also will be remembered that the arm 369 is given a short preliminary movement in clockwise direction by the movement of the total control lever 29 from its "add" position to any of its several total or sub-total positions. This movement is insufficient to remove the arm 170 from above the ear 173. However, this movement of the total lever 29 sets the machine to make a totalizing operation and near the end of the first cycle of such an operation, the cam disk 375 (Fig. 21), through the linkage heretofore explained, rocks the arm 369 and its stud 368 an additional distance, as described above. This second movement of the arm 369 and the stud 368 rocks the lever 171, sufficiently to shift the arm 170 thereon out of the path of the ear 173 to permit the slide 140 to function as heretofore described, to feed the slip on the second cycle of totalizing operations.

When entering the items of a multiple-item transaction, it is not desired to print on the slip, and therefore, the slip printing hammer 78 is disabled under the control of the multiple-item keys 505 and, inasmuch as no printing is performed, it is not necessary to feed the slip. On such operations, the low sector 396 (Figs. 12 and 13) of the cam arm 394 cooperates with the roller 398, and the arm 369 is not disturbed. Hence, the arm 170 of the stop lever 171 remains in the position in which it is shown in Fig. 14, to prevent operation of the slide 140 to feed the slip. However, when a single-item key 506 is depressed and the machine operated, the cam arm 394 is differentially positioned under the control of the single-item key to bring the high sector 397 of the cam arm 394 into cooperative relation with the roller 398, thereby rocking the arm 399 and the associated mechanism to rock the arm 369 and its stud 368 clockwise. This movement of the arm 369 and stud 368, rocks the stop lever 171 to shift the arm 170 out of the path of the ear 173 to permit the slip feed slide 140 to function.

Control of check and slip tension

The check or receipt feeding mechanism, described above, operates at each operation of the machine regardless of the nature of the transaction involved. However, on those operations when no receipt is to be issued, the check tension roller 113 is withdrawn from contact with the check feed roller 110, which effectively prevents the issuance of a receipt.

The means for disabling the check tension roller 113, which is controlled by the insertable slip, and also by the slip key 280, has been heretofore described, and it will be recalled that the cams 221 and 222 (Fig. 7) normally disable the check tension at each operation of the machine. But, if no slip is present in printing position, the link 268 (Fig. 6) moves upwardly under the influence of the spring 199 and uncouples the link 243 from the stud 241, thus permitting the check tension to remain effective. When entering the several items of a multiple-item operation, a slip having been placed in the machine, or the "slip" key 280 having been depressed, the link 268 is prevented from disconnecting link 243 from its driving means, and the tension roller 113 will be withdrawn from contact with the feed roller 110 and restored to contact therewith at each operation of the machine. This latter condition is undesirable, and, therefore, means is provided to latch the check tension roller 113 in its ineffective position apart from the roller 110 during the entering of the items of a multiple-item transaction.

As soon as the arms 116 and 118 (Fig. 6) rock clockwise, as previously described, to lower the tension roller 113, a spring 406 (Fig. 11) rocks a latch lever 407 pivoted on a stud 408 on the frame 51, counter-clockwise to move a shoulder 409 of the latch lever 407 under a stud 416 projecting laterally from the arm 116, to prevent counter-clockwise movement of the arms 116 and 118 and of the arms 114, thus holding the roller 113 away from the roller 110. The lever 407 remains in this position until the machine is subsequently operated with no slip in printing position.

On such an operation, it will be remembered, the link 303 (Fig. 11) is moved towards the left under the influence of the spring 199, which slides the stud 304 along the bottom of the opening 305, in the frame 51, whereupon a half round section 405 of the stud 304, which projects through the link 303, is positioned under a shoulder 417 of the latch lever 407. Shortly thereafter, the cams 147 and 148 (Fig. 11) rock the lever 162 counter-clockwise and on this movement, the inclined free end 435 of the lever 162, acting on the stud 304, rocks the link 303 upwardly on its pivot on the arm 267, whereupon the section 405 of the stud 304 contacts the shoulder 417 of the latch lever 407 and rocks the latch lever clockwise to remove the latching shoulder 409 from beneath the stud 416 on the tension roll arm 116 to permit the spring 112 to move the tension roller 113 into contact with feed roller 110.

A spring 436 (Fig. 11), normally maintains the stud 304, on the free end of the link 303, in contact with the lower wall of the opening 305, and when the lever 162 is rocked counter-clockwise to wipe the inclined free end 435 under the stud 304 to raise the link, the spring is further tensioned. Subsequent return movement of the lever 162 releases the free end of the link 303 to permit the spring 436 to restore the link to normal position wherein the stud 304 is in contact with the lower wall of the opening 305.

The check tension is not controlled by the total control lever 29 or by the single or multiple-item keys 505 and 506. The slip tension, on the other hand, is controlled by the single and multiple-item keys 505 and 506 and by the total control lever 29, but is not controlled by the slip feeler 190. When registering the items of a multiple-item transaction, at which time it is desired not to print on a slip, the slip tension is made effective during the operation when the first item is entered and is retracted to the ineffective position regardless of whether there is a slip in the machine or not.

It will be remembered that the lever 124 (Figs. 17, 18 and 19) which carries the slip feed and tension roller 121, is normally held in its ineffective position against the tension of the spring 176 by the stud 179 on the pitman 181 which prevents counter-clockwise movement of the pawl 178 and the lever 124. When the cams 182 and 183 draw the pitman 181 towards the right, the stud 179 is carried therewith, thus freeing the lever 124 to the action of its spring 176 which immediately rocks the lever 124 counter-clockwise to bring the roller 121 into contact with roller 169. Then when the cams 182 and 183 restore the pitman 181 to the left, the stud 179 contacts the pawl 178 and rocks the lever 124 clockwise to separate the rollers 121 and 169.

When entering the items of a multiple-item transaction on a check issuing operation, or with no slip in the machine, it is unnecessary to actuate the slip tension mechanism, and therefore this rocking movement of the lever 124 at each item entering operation is prevented. This is accomplished by rocking the pawl 178 out of the path of the stud 179 so that the tension roller 121 contacts the roller 169 on the first item entering operation and remains in contact therewith until near the end of the multiple-item total taking operation. A finger 419 (Fig. 20) of a lever 420 journaled on the rod 132, lies in the path of a stud 421 on the pawl 178.

On multiple-item entering operations, this lever 420 remains in the position in which it is shown in Figs. 19 and 20, and as the pitman 181 draws the stud 179 towards the right, and away from the nose of the pawl 178, the spring 176 rocks the lever 124 counter-clockwise to establish contact between the rollers 121 and 169. In so doing, it causes the stud 421 to strike the left hand edge of the finger 419 and as the lever 124 continues its counter-clockwise movement, the stud 421 rides upwardly along the finger 419 thus rocking the pawl 178 counter-clockwise against the tension of its spring to raise the nose of said pawl above the reciprocatory path of the stud 179. Now when the pitman 181 returns the stud 179 towards the left, the stud moves beneath the pawl 178 to permit the slip tension rollers to remain in contact. During the remainder of the item entering operations, the stud 179 merely reciprocates under the raised pawl 178 having no effect thereon. When all of the items of a multiple item transaction have been entered, and it is desired to take the total thereof, the total control lever 29 is moved to its "item total" position. It will be recalled that the adjustment of this lever to any of its "total" or "sub-total" taking positions, operates a linkage to impart a preliminary rocking movement to the shaft 352 and sets up a condition, whereby, near the end of the first cycle of such operation, the cam disk 375 (Fig. 21) rocks the shaft 352 an additional distance in clockwise direction. A stud 422 (Figs. 19 and 20) on the arm 358 on the shaft 352, projects through a cam slot 423 in the lever 420.

The preliminary movement of the shaft 352 by the adjustment of the total lever 29, which is transmitted to the arm 357 (Fig. 14) by the stud 355 and by the spring 359 to the arm 358, does not effect the lever 420 (Fig. 20) as the stud 422 at that time traverses a concentric part of the slot 423. The additional movement of the shaft 352 imparted thereto by the cam disk 375 (Fig. 21) which movement, however, is held up by the tail 393 (Fig. 19) on the pitman 181 blocking the clockwise movement of arms 366 and 369 until near the end of the first cycle of operation of a totalizing operation, rocks the arm 358 farther in clockwise direction to carry the stud 422 into the upper part of the cam slot 423, thereby rocking the lever 420 counter-clockwise. This removes the finger 419 from the path of the stud 421 and permits the pawl 178, influenced by its spring 176, to resume its position in the reciprocatory path of the stud 179, so that this stud, when the pitman 181 restores it to its left hand position near the end of a totalizing operation, contacts the pawl 178 to rock the lever 134 clockwise and release the tension on the slip by separating the roller 121 from the roller 169.

When entering single-item transactions, it is desirable that the slip tension roller 121 contact the roller 169 shortly after the beginning of each operation and separate therefrom just before the end of each operation. To effect this result, the shaft 352 is rocked by the differential cam arm 394 (Figs. 12 and 13), the high sector 397 of which, it will be recalled, wipes beneath the roller 398 under the control of the single-item key 506. This immediately throws the arm 358 (Figs. 19 and 20) clockwise, positioning the stud 422 in the upper part of the slot 423 to rock the lever 420 counter-clockwise to ineffective position and enables the tension roller 121 to establish contact with the roller 169 in the normal manner, with the finger 419 out of the path of the stud 421. Therefore, the pawl 178 is not rocked clockwise out of the path of the stud 179, and when the pitman 181 restores the stud 179 towards the left, this stud contact the pawl 178 and restores the lever 124 to its normal position, thus removing the tension roller 121 from the inserted slip.

*Control of slip tension by slip key*

From the above description it can be seen that the slip tension goes on at the first item entering operation of a multiple-item transaction and remains on until near the end of the multiple-item total taking operation. This condition exists whether there is a slip in the machine or not. Sometimes the operator desires to place the slip within his vision so that he may enter the items therefrom into the machine, and then put the slip in the printing position after he has entered the last item and before the machine is operated to take the multiple-item total.

It is, therefore, necessary to be able to so control the slip tension that the rollers 121 and 169 are held apart to permit insertion of the slip therebetween, just before the machine is released to take the total of the series of items comprising a multiple item transaction.

It will be recalled that just prior to such an operation, the "slip" key 280 (Figs. 8 and 17) is depressed to disable the check tension means, as has been previously described. This is done because there is no slip in the machine and since the slip is to be inserted later to receive the impression of the item total, it is not desired to issue a check.

Depression of the "slip" key 280 (Fig. 17) removes a shoulder 424 thereon from in front of a stud 425 on a tension restraining lever 427 pivoted on a stud 428 projecting from the frame 51. As soon as the "slip" key 280 is depressed, a spring 429 snaps the lever 427 counter-clockwise to position an ear 430 thereon beneath a stud 432 on the slip tension lever 124 to prevent counter-clockwise movement of said lever 124, thus holding the roller 121 separated from the roller 169 to permit insertion of the sales slip at the proper time.

After the last item has been read from the slip and entered into the machine, the slip is placed in position in the printing device to receive the impression of the multiple-item total. The total control lever 29 is then adjusted to the multiple-item total position and the machine is released for operation. Since the slip is now in the machine, it is necessary to render the slip tension effective in order to feed the slip in the manner heretofore described.

The shaft 352, as above explained, receives a preliminary clockwise movement due to the adjustment of the total control lever 29 to one of its "total" or "sub-total" taking positions. The cam disk 375 (Fig. 21) then rocks the shaft 352 farther in clockwise direction near the end of the first cycle of a totalizing operation, through the mechanism heretofore described. This additional movement of the shaft 352 brings a foot 433 (Fig. 17) of the slotted arm 403 into contact with a stud 434 on the slip tension restraining lever 427 and rocks this lever clockwise against the tension of the spring 429, whereupon, as the ear 430 clears the stud 432, the spring 176 rocks the lever 124 counter-clockwise to establish the necessary tension on the slip now between rollers 121 and 169 in order that said slip may be fed at the proper time by the slip feeding mechanism, described above. When the "slip" key 280 is released, as above described, and restored to its normal undepressed position by the spring 300 (Fig. 8), the shoulder 424 (Fig. 17) is rocked into position in front of the stud 425, restoring the slip tension restraining lever 427 to its normal position and blocking its counter-clockwise movement until the "slip" key is again depressed.

On single-item transactions, the "slip" key 280 is usually not depressed, the slip, if it is desired to print on one, being inserted before the machine is released for operation. However, should the "slip" key be accidentally depressed prior to such an operation, the slip tension restraining lever 427 would hold up the tension lever 124, thereby preventing proper feed of the inserted slip. This condition would, of course, be undesirable and provision is made to prevent its occurrence.

On single-item transactions, the high sector 397 of the differential cam arm 394 (Figs. 12 and 13) is moved into cooperative relation with the roller 398 to rock the arms 399 and 403 to the full extent of their clockwise movement. The foot 433 (Fig. 17) of the arm 403 then contacts the stud 434 on the restraining lever 427 and rocks said lever immediately to its ineffective position, thereby permitting the tension to be established on the slip at the proper time.

When entering the items of a multiple-item transaction, it is desired to lock the "slip" key in its depressed position throughout the series of item entering operations. On the first item entering operation, the tension lever 124 rocks counter-clockwise until arrested by the ear 430 of the restraining lever 427, which was shifted under the stud 432 when the "slip" key 280 was depressed. This partial travel of the lever 124 positions a stud 440 on said lever in front of a tail 441 on the "slip" key retaining pawl 285 to lock the nose of the pawl in the notch in the "slip" key 280 until the tension lever 124 is rocked clockwise, near the end of the itemized total operation, to release the slip tension. Since the lever 124 remains in its partially moved position throughout the series of item entering operations of a multiple-item transaction, the slip key 280 is held in its depressed position during and between the item entering operations.

*Machine operating mechanism*

To operate the machine and the above-described printing mechanism, power may be applied by any suitable means to an intermediate gear 442 (Fig. 1) journaled on a stud 443. This intermediate gear 442 meshes with a gear 444 fast on the drive shaft 74 and with a gear 445 journaled on the rod 149. Any suitable power producing device, preferably an electric motor of conventional design, may be employed to rotate the gear 442 in counter-clockwise direction to turn the gears 443 and 445 through one complete clockwise rotation on each operation of the machine.

*Machine release mechanism*

It has been stated above that the machine release shaft 299 is rocked first clockwise to release the machine for operation, then counter-clockwise past its normal position near the end of the operation to release the depressed amount keys (not shown), and then clockwise to its normal position. The mechanism for operating the shaft 299 will now be described.

Before the machine can be released for operation, it is necessary that the slip key 280 be either in its normal raised position or in its fully depressed position.

The lever 288 has a notch 448 (Figs. 1 and 8) normally in alinement with the ear 301 on the arm 302, which, it will be recalled, rocks with the shaft 299. The notch 448 thus affords a space for the ear 301 when the shaft 299 is rocked clockwise to release the machine when the slip key 280 is in its normal position.

Should the key 280 be held in a partially depressed position by the operator, then a finger 449 of the latch lever 288 is beneath the ear 301, and the shaft 299 can not be rocked to release the machine. Upon full depression of the key 280, the finger 449 is moved to the right, out of the path of the ear 301, thus permitting the rocking of the shaft 299 to release the machine.

A pawl 450 (Fig. 21) pivoted on a stud 451 projecting from the frame 348, normally holds the release shaft 299 in its normal position against the tension of a spring 452, by contact with a flat stud 453 on an arm 454 fast on the shaft 299 thus blocking clockwise movement of said shaft. The spring 452 is compressed between the bottom of a slot 455 in a link 456 and the shoulders on a pair of spring pilots 457 (only one of which is shown) pivoted on a stud 458 projecting from an arm 459 also fast on the release shaft 299. When the pawl 450 is rocked counter-clockwise out of the path of the stud 453, by mechanism to be described later, the spring 452 expands and rocks the arm 459 and release shaft 299 clockwise to release the machine for operation. The pawl 450 is rocked by depression of a motor release bar 460 (Fig. 21), the stem 461 of which is detachably mounted on a slide 462, carried on studs 463 projecting from the frame 348. A button stud 464 floating in a slot 465 in the slide 462 and in a slot 466 in one arm of a bell crank 467 pivoted on a stud 468 projecting from the frame 348, connects the slide 462 to the bell crank. A link 469 connects the bell crank 467 to a downwardly extending arm 470 secured to the pawl 450. A spring 475 normally holds the slide 462 in its outward or undepressed position.

When the motor release bar 460 is depressed, it compresses a spring 476 guided by a pilot on an ear 477 on the slide 462 and by a pilot on an ear 478 of the bell crank 467, until the tension of said spring is sufficient to overcome the friction of the stud 453 pressing against the pawl 450 under the influence of spring 452. When the friction is overcome, the motor bar 460, through the train of mechanism just above described, rocks the pawl 450 out of the path of the stud 453, whereupon the spring 452 rocks the release shaft 299 clockwise. This movement of the release shaft 299 positions the flat stud 453 beneath the pawl 450 and the stud 458 moves to the top of the slot 455 in link 456. The clockwise movement of the arm 459 and the release shaft 299 is limited by an arm 471 rigid with the arm 459, striking a stop stud 472 on arm 507.

To rock the release shaft 299 counter-clockwise to release the amount keys (not shown), the link 456 is lowered by the following mechanism.

It will be recalled that the gear 392 makes one-half of a counter-clockwise rotation at each adding operation of the machine. A cam groove 480 cut in the side of the gear 392 cooperates with a roller 481 on a lever 482 pivoted on the stud 379 to rock the lever 482 first clockwise, and then counter-clockwise to its normal position near the end of each operation of the machine.

On the clockwise movement of the lever 482, a stud 483 thereon projecting laterally through a recess formed in the wall of an opening 484 in the link 456, lowers the link to rock the arm 459, release shaft 299 and arm 454 counter-clockwise. This carries the flat stud 453 to the rear of the pawl 450, whereupon the spring 475 draws the slide 462 outwardly, which through bell crank 467 and link 469 rocks the pawl 450 into the path of the stud 453. Now when the cam groove 480 rocks the lever 482 to raise the link 456, stud 453 encounters the end of pawl 450 and its clockwise movement is arrested thereby. The remainder of the upward movement of the link 456 compresses the spring 452 preparatory to rocking the release shaft 299 when the motor bar 460 is again depressed to release the machine for the next operation.

*Modified check tension controlling mechanism*

In the check tension controlling mechanism described above, the tension is normally "on" and is thrown "off" at each operation of the machine unless the link 268 (Fig. 6) is operated either under the influence of the slip feeler finger 190 or by depression of the "slip" key 280, to disconnect the link 243 from its driving means.

In some cases it is desirable to control the issuance of a check by means other than an insertable slip, and therefore, the structure shown in Figs. 6 and 8 may be modified as shown in Fig. 26. In the modified structure, a tail 490 projecting from a lever 491 pivoted on the stud 239, normally lies beneath a stud 492 on the link 243 to hold the shoulder 242 of the link above the path of the stud 241.

As long as the link 243 is held in this position, the tension roller 113 will be held in contact with feed roller 110 and a check will be issued. When the link 243 is lowered to bring the shoulder 242 in the path of the stud 241, upon operation of the machine, the tension roller 113 will be withdrawn from contact with the roller 110 by the bell crank 237. In this modified form, the link 243 may only be connected to its operating means from one source, namely, the "slip" key 280, the depression of which draws the link 283 toward the left to rock the lever 491 counter-clockwise, which removes the tail 490 from beneath the stud 492 and allows the spring 255 to lower the link 243 to effective position. The "slip" key 280, in the modified form (Fig. 26), is released and restored to its normal position in the same manner as hitherto described, under the influence of the spring 300 (Fig. 8). The restoring of the key 280 rocks the lever 491 clockwise to raise the link 243, and disconnect the check tension device from its releasing mechanism.

When a series of items comprising a multiple item transaction is to be entered into the machine, and the "slip" key 280 is depressed to disable the check tension, and prevent issuance of a check, the link 243 is connected to its driving means and is operated at each of the item entering operations.

On such operations, however, it is desired to withdrawn the check tension roller 113 at the first item entering operation, and maintain it in the withdrawn position throughout the remainder of the multiple-item entering operations. This is accomplished by positioning the shoulder 409 on the latching lever 407 beneath the stud 416 on the arm 116. In the structure shown in Fig. 11, the latching lever 407 is normally free to rock counter-clockwise to so position the shoulder 409, but in the modified form, a link 496, corresponding somewhat to the link 303 in Fig. 8, and sliding on a stud 497 in the side frame 51, carries a stud 495 projecting on each side of the link. One end of the stud 495 projects into the slides along the bottom of the opening 305 in the frame 51, the opposite shouldered end on the stud 494 normally lying beneath the shoulder 417 of the latch lever 407 to prevent counter-clockwise movement thereof, and hence prevent the shoulder 409 at the upper end of the latch lever 407 from being moved beneath the stud 416 of the roller tension arm 116. Depression of the key 280 rocks the lever 491 counter-clockwise, and by a pin and slot connection 498—499 rocks clockwise a link 500 similar to the link 268 (Fig. 8), supported on the arm 267. A bifurcated projection 501 on the link 500 straddles a stud 502 in the end of the link 496, and through this connection, the link 496 is drawn towards the right, as viewed in Fig. 26, to remove the shouldered end 494 of the stud 495 from beneath the shoulder 417, so that when the arms 114, 116 and 118 are rocked clockwise to lower the roller 113, the spring 406 rocks the latch lever 407 counter-clockwise to position the shoulder 409 at the upper end of the latch beneath the stud 416 of the tension arm 116.

The key 280 remains in its depressed position throughout the series of item entering operations of a multiple-item transaction, and is released, as described above, near the end of a totalizing operation.

The spring 300 (Fig. 8) rocks the lever 288 counter-clockwise to draw the link 283 towards the right, as viewed in this figure, to restore the key 280 to its undepressed position. This movement of the link 283 rocks the lever 491 (Fig. 26) clockwise and the link 500 counter-clockwise to slide the link 496 towards the left, thereby replacing the stud 495 beneath the shoulder 417 to hold the latch lever 407 in its normal position.

While the form of mechanism herein shown and described is admirably adapted to fulfil the objects primarily stated, it is to be understood that it is not intended to confine the invention to the one form or embodiment herein disclosed, for it is susceptible of embodiment in various forms all coming within the scope of the claims which follow.

What is claimed as new is:

1. In a machine of the class described, the combination with a printing element; means to take impressions therefrom on an issuing record material; means to take impressions from said printing element on an inserted record material, and on another record material; of means to feed the issuing record material; means normally operable on each operation of the machine to render said feeding means ineffective; and means to disable the normally operable means, said disabling means adapted to be rendered ineffective by the insertable record material.

2. In a machine of the class described, the combination with a printing element; means to take impressions therefrom on an issuing record material; means to take impressions from the printing element on an insertable record material, and on another record material; means to feed the issuing record material including gripping means; of means normally operable on each operation of the machine to move the gripping means to ineffective position; means to disable said moving means, said disabling means adapted to be rendered ineffective by the insertable record material; and manually operable means to render said disabling means ineffective.

3. In a machine of the class described; the combination with a printing element; means to take impressions therefrom on an issuing record material; means to take impressions from said printing element on an insertable record material, and on another record material; feeding means for said issuing record material; and tension means for said feeding means; of means to normally operate the tension means to release the tension on the record material; driving means for said tension-release operating means; and means to disconnect said driving means from said operating means, said disconnecting means adapted to be disabled by the insertable record material.

4. In a machine of the class described; the combination with a printing element; means to take impressions therefrom on an issuing record material; means to take impressions from the printing element on an insertable record material, and on another record material; means to feed the issuing record material; a tension device for said feeding means; and means to feed the inserted record material; of means to normally operate the tension device to release the tension; means to drive the tension-release operating means; means to disable said operating means to render the issuing record material feeding means effective, said disabling means adapted to be rendered inactive by the insertable record material; and means to disable the feeding means for said insertable record material, said last-named means adapted to be rendered inactive by the insertable record material.

5. In a machine of the class described; the combination with a printing element; a plurality of means to take the impressions therefrom on an issuing record material; means to take impressions from the printing element on an insertable record material, and on another record material; means to feed the issuing record material; tension means cooperating with said feeding means to feed the issuing record material; and means to feed the insertable record material; of means to normally shift the tension means to render the issuing record material feeding means ineffective, and to disable the impression means for said issuing record material; means to disable said shifting means to render the issuing record feeding means effective, and enable the first-mentioned impression means to take impressions on the issuing record material, said disabling means adapted to be rendered ineffective by the insertable record material; and means to disable the insertable record material feeding mechanism, and to disable the insertable record material impression means, said last named means adapted to be rendered ineffective by the insertable record material.

6. In a machine of the class described; the combination with a printing element; a plurality of means to take impressions therefrom on an issuing record material; means to take impressions from the printing element on an insertable record material; means to feed the issuing record material; tension means cooperating with said feeding means; and means to feed the insertable record material; of means to normally shift the tension means to render the issuing record material feeding means ineffective, and to disable the impression means for said issuing record material; means to disable the shifting means to render the issuing record material feeding effective, and enable the first-mentioned impression means to take impressions on the issuing record material, said disabling means adapted to be rendered ineffective by the insertable record material; means to disable the insertable record material feeding means, and to disable the insertable record material impression means, said last-named disabling means also adapted to be rendered ineffective by the insertable record material; and manually operable means to render the issuing record material impression means and feeding means ineffective.

7. In a machine of the class described, the combination with a feeding means adapted to feed an issuing record material; and tension means cooperating with the feeding means and having an effective position and an ineffective position; of means to shift the tension means to its ineffective position; and means to hold the tension means in its ineffective position throughout a series of item entering operations.

8. In a machine of the class described, the combination with a feeding means; and tension means cooperating with the feeding means to feed an issuing record material, and having an effective position and an ineffective position; of means to shift the tension means to the ineffective position at each operation of the machine; means to disable the shifting means; means to retain the tension means in the ineffective position; and means controllable by insertable record material to determine when the retaining means is to be released.

9. In a machine of the class described, the combination with a feeding means; and tension means cooperating with said feeding means to feed an issuing record material, and having an effective position and an ineffective position; of means to shift the tension means to its ineffective position; means to retain the tension means in its ineffective position during a series of operations, said retaining means having a shoulder thereon; a link having a stud thereon; means to shift said link to position the stud on said link under the shoulder on the retaining means, said shifting means adapted to be rendered ineffective by insertable record material; means operating through said stud to disable the retaining means to free the tension means; and spring means to shift the tension means to its effective position.

10. In a machine of the class described; the combination with a record material feeding roller; a tension roller cooperating with the feeding roller to feed the record material; and an arm supporting the tension roller; of another arm connected to the supporting arm; a lever connected to the second-mentioned arm; a bell crank having a stud on one arm thereof; a link connecting the lever with the stud on said arm of the bell crank; a reciprocating member operatively connected to the other arm of the bell crank; and means to operate the reciprocating member to release the tension roller.

11. In a machine of the class described; the combination with a record material feeding roller; a tension roller cooperating with the feeding roller to feed the record material; and an arm supporting the tension roller; of another arm connected to the supporting arm; a lever connected to the second-mentioned arm; a bell crank having a stud on one arm thereof; a link connecting the lever with the stud on said arm of the bell crank; a reciprocating member operatively connected to the other arm of the bell crank; means to operate the reciprocating member to release the tension roller; and means to disconnect the link from said bell crank to prevent release of the tension roller, said disconnecting means adapted to be rendered ineffective by insertable record material.

12. In a machine of the class described; the combination with a record material feeding roller; a tension roller cooperating with the feeding roller to feed the record material; and an arm supporting the tension roller; of another arm connected to the supporting arm; a lever connected to the second-mentioned arm; a bell crank having a stud on one arm thereof; a link connecting the lever with the stud on said arm of the bell crank; a reciprocating member operatively connected to the other arm of the bell crank; means to operate the reciprocating member to release the tension roller; and manually operable means to render said disconnecting means ineffective.

13. In a machine of the class described; the combination with a feeding means; and a tension means cooperating therewith to feed an issuing record material; of means to release the tension means; means to operate the releasing means; a link; and means to operate said link to disconnect the releasing means from its operating means, said operating means adapted to be disabled by the insertable record material.

14. In a machine of the class described; the combiantion with a feeding means; and a tension means cooperating therewith to feed an issuing record material; of means to release the tension means; means to operate the tension releasing means; a link; means to operate said link to disconnect the releasing means from its operating means, said link operating means adapted to be rendered ineffective to disconnect the releasing means from its operating means by insertable record material; and manipulative means, superseding the control of the link operating means by the insertable record material, to render the link ineffective to disconnect said tension releasing means from its operating means.

15. In a machine of the class described; the combination with a feeding means; and a tension means cooperating with said feeding means to feed an issuing record material; of means to release the tension means; means to operate the tension releasing means; a link having an effective and an ineffective position; spring-actuated means to move the link to its effective position to disconnect the tension releasing means from its operating means, said spring actuated means adapted to be restrained by insertable record material to maintain the link in its ineffective position; and manipulative means to control the effectivity of the spring actuated means.

16. In a machine of the class described; the combination with a feeding means; and a tension means cooperating therewith to feed an issuing record material; of means to release the tension; means to operate the releasing means; a link connecting the releasing means with the operating means; a stud on said link; a second link adapted to cooperate with said stud; and means to actuate the second-mentioned link to disconnect the tension release means from its operating means adapted to be rendered ineffective by insertable record material.

17. In a machine of the class described; the combination with a feeding means; and a tension means cooperating therewith to feed an issuing record material; of means to release the tension means; means to operate the releasing means; a link connecting the releasing means with the operating means; a stud on said link; a second link adapted to cooperate with said stud; means to actuate the second-mentioned link to disconnect the tension release means from its operating means adapted to be rendered ineffective by insertable record material; a lever connected to the second-mentioned link; and manipulative means to control the effectivity of the link actuating means.

18. In a machine of the class described; the combination with a feeding means; and a tension means cooperating therewith to feed an issuing record material; of means to release the tension means; means to operate the releasing means; a link connecting the releasing means and the operating means; a stud on said link; a second link adapted to cooperate with said stud; and spring means to actuate the second-mentioned link to disconnect the tension release means from its operating means, said spring means adapted to be restrained by insertable record material; a lever connected to the second-mentioned link; manipulative means to rock said lever to render the second-named link ineffective.

19. In a machine of the class described; the combination with a plurality of means to print on an issuing record material; and means to disable said printing means; of means to actuate the disabling means to prevent operation of said printing means; means to retain the disabling means in its effective disabling position to prevent operation of said printing means during a plurality of operations; means controllable by insertable record material to release the retaining means; and means to restore the disabling means to ineffective position.

20. In a machine of the class described; the combination with a plurality of means to print on an issuing record material; means to feed said record material; tension means cooperating with said feeding means; and means to disable said impression means and said tension means; of means to operate said disabling means; means to retain said tension means in disabled position and to retain the impression-disabling means in effective position; means controllable by insertable record material to release the retaining means; and means to restore the tension means to effective position and to restore the impression-disabling means to ineffective position.

21. In a machine of the class described; the combination with a plurality of means to print on an issuing record material; means to feed the issuing record material; and tension means cooperating with said feeding means; of means to disable the printing means and to shift the tension means to disable the feeding means; means to operate said disabling means; means comprising a latch to retain the tension means in its ineffective position, and to retain the disabling means for the printing means in its effective position; a link carrying a stud adapted to cooperate with the retaining means, said stud being normally out of cooperative relation with said retaining means; means to move said stud into cooperative relation with said retaining means; and means to move said stud in a different direction to rock the retaining means to release the same so that the tension means and the disabling means for the printing means may return to their normal positions.

22. In a machine of the class described; the combination with an issuing record feeding means; a tension means cooperating with the feeding means and having effective and ineffective positions; and means to shift the tension means to its ineffective position; of means to disable the tension shifting means; manipulative means to control the effectivity of said disabling means; means to retain the tension means in its ineffective position; normally ineffective means to disable the retaining means to release the tension means; and means to render effective said normally ineffective means.

23. In a machine of the class described; the combination with a feeding mechanism; and a tension means cooperating with the feeding mechanism to feed an insertable record material, and having an effective and an ineffective position; of means to normally retain the tension means in its ineffective position; means to withdraw the retaining means; means to shift the tension means to its effective position; and manipulative means to prevent movement of the tension means to its effective position.

24. In a machine of the class described; the combination with a roller on a fixed axle; and another roller on a rocking lever; of means to restrain the rocking lever to maintain the rollers apart; a pair of cams to withdraw the restraining means; a spring to rock the lever to bring the rollers into operative relation to feed a record material; and manipulative means to restrain the rocking lever to hold the rollers apart.

25. In a machine of the class described; the combination with a feeding roller rotatably supported on a shifting lever; means to rotate said roller to feed a record material; and a spring to move the roller into contact with another roller to grip the record material and render the feeding roller effective; of means to restrain the shifting lever to hold the rollers apart; and means to render the restraining means ineffective during a series of operations.

26. In a machine of the class described; the combination with a shiftable support; a feeding roller rotatably mounted on the support; means to rotate the roller to feed a record material; and a spring to move the roller into contact with another roller to grip the record material and render the feeding roller effective; of means to restrain the shiftable support to hold the rollers apart; means to withdraw the restraining means; means to render the restraining means ineffective during a series of operations; and other means to restrain the shiftable support during said series of operations.

27. In a machine of the class described; the combination with a shiftable support; a feeding roller rotatably mounted on the support; means to rotate the roller to feed a record material; and a spring to move the roller into contact with another roller to grip the record material and render the feeding roller effective; of means to restrain the shiftable support to hold the rollers apart; means to withdraw the restraining means; means to render the restraining means ineffective during a series of operations; other means to restrain the shiftable support during said series of operations; and means to withdraw the second-mentioned restraining means.

28. In a machine of the class described; the combination with a feeding roller; a shiftable support for said roller; means to rotate the roller to feed a record material; and a spring to shift the roller into contact with another roller to grip the record material; of means to restrain the shiftable support to hold the rollers apart; means to withdraw the restraining means; means to render the restraining means ineffective during a series of operations; manipulative means to restrain the shiftable support during said series of operations; and means to withdraw the second-mentioned restraining means on certain operations.

29. In a machine of the class described; the combination with a feeding roller; a shiftable support for said roller; means to rotate the roller to feed a record material; and a spring to shift the support and bring the roller into contact with another roller to grip the record material; of a pawl on the shiftable support; a pitman having a stud thereon to cooperate with the pawl to restrain the shiftable support and hold the rollers apart; means to withdraw the stud to release the shiftable support to the action of the spring; means to rock the pawl out of cooperative relation with said stud to render said stud ineffective to restrain the shiftable support during a certain series of operations; and means under the control of a depressible key to restrain the shiftable support during said series of operations.

30. In a machine of the class described; the combination with a feeding roller; a rocking lever supporting said roller; means to rotate the roller to feed a record material; and a spring to rock the lever and shift the roller into contact with another roller to grip the record material; of a pawl on the lever; a pitman having a stud thereon to cooperate with the pawl to restrain the lever and hold the rollers apart; means to withdraw the stud to release the lever to the action of the spring; means to rock the pawl out of cooperative relation with said stud to render said stud ineffective to restrain the lever during a certain series of operations; a lever having an ear thereon; a depressible key to normally hold said lever in ineffective position; and a spring operable upon depression of the key, to rock the lever to position the ear beneath a stud on the rocking lever to restrain said rocking lever.

31. In a machine if the class described; the combination with a feeding roller; a rocking lever supporting said roller; means to rotate the roller to feed a record material; and a spring to rock the lever to shift the roller into contact with another roller to grip the record material; of a pawl on the lever; a pitman having a stud thereon to cooperate with the pawl to restrain the lever and hold the rollers apart; means to withdraw the stud to release the lever to the action of the spring; means to rock the pawl out of cooperative relation with said stud to render said stud ineffective to restrain the lever during a certain series of operations; a lever having an ear thereon; a depressible key to normally hold said lever in its ineffective position; a spring operable upon depression of the key, to rock the lever to position the ear beneath a stud on the rocking lever to restrain said rocking-lever; and an arm to rock the second-mentioned lever to free the rocking lever to the action of the first-mentioned spring.

32. In a machine of the class described, the combination with a feeding roller; a rocking lever supporting said roller; means to rotate the roller to feed a record material; and a spring to rock the lever to shift the roller into contact with another roller to grip the record material; of means to restrain the rocking lever to hold the rollers apart; means to withdraw the restraining means; means to render the restraining means ineffective during a series of operations; means, under the control of a depressible key, to restrain the rocking lever during said series of operations; and means on said rocking lever to hold said depressible key in its depressed position during the series of operations.

In testimony whereof I affix my signature.
SAMUEL BRAND.